US009188268B2

(12) United States Patent
Shank et al.

(10) Patent No.: US 9,188,268 B2
(45) Date of Patent: Nov. 17, 2015

(54) VEHICLE WINDSHIELD CLEANING SYSTEM

(71) Applicant: UUSI, LLC, Reed City, MT (US)

(72) Inventors: David W. Shank, Hersey, MI (US); John Washeleski, Cadillic, MI (US); Peter Strom, Big Rapids, MI (US)

(73) Assignee: UUSI, LLC, Reed City, MI (US)

( * ) Notice: Subject to any disclaimer, the term of this patent is extended or adjusted under 35 U.S.C. 154(b) by 5 days.

(21) Appl. No.: 13/948,450

(22) Filed: Jul. 23, 2013

(65) Prior Publication Data

US 2013/0306165 A1  Nov. 21, 2013

Related U.S. Application Data

(60) Division of application No. 13/414,912, filed on Mar. 8, 2012, now Pat. No. 8,505,832, which is a division of application No. 12/393,111, filed on Feb. 26, 2009, now Pat. No. 8,157,187, which is a
(Continued)

(51) Int. Cl.
*B60S 1/48* (2006.01)
*B60S 1/50* (2006.01)
(Continued)

(52) U.S. Cl.
CPC ............... *F16L 53/002* (2013.01); *B05B 9/002* (2013.01); *B60S 1/482* (2013.01); *B60S 1/488* (2013.01); *B60S 1/50* (2013.01); *Y10T 137/6579* (2015.04)

(58) Field of Classification Search
CPC ............ B60S 1/48; B60S 1/481; B60S 1/482; B60S 1/488; B60S 1/50; B05B 9/002; F16L 53/002

USPC ............. 239/13, 130, 135, 284.1, 284.2, 600; 165/42, 132; 137/340, 341; 392/465, 392/485; 15/250.05
See application file for complete search history.

(56) References Cited

U.S. PATENT DOCUMENTS 4,090,668 A  5/1978  Kochenour
4,233,494 A  11/1980  Pawlik et al.
(Continued)

FOREIGN PATENT DOCUMENTS

EP  0219126  4/1987
EP  1213197  6/2002
(Continued)

OTHER PUBLICATIONS

International Search Report and Written Option ( 8 pages) for International Appliation No. PCT/US08/07878, mailing date Sep. 29, 2008.
(Continued)

*Primary Examiner* — Darren W Gorman
(74) *Attorney, Agent, or Firm* — Howard & Howard Attorneys PLLC

(57) ABSTRACT

Apparatus for providing a heated cleaning fluid to a vehicle surface having an inlet port for receiving an amount of fluid; a housing bounding a reservoir in fluid communication with the inlet port; and an outlet port in fluid communication with the reservoir for dispensing an amount of heated fluid. A heater element heats fluid that passes from the inlet to the outlet port through the reservoir. A heat exchanger in thermal contact with the heater element for conveying heat to the fluid within the reservoir has a strut that divides fluid entering the housing through the inlet port into two flow paths and elongated fins that extend outwardly from the strut at transverse angles that bound fluid flow channels for fluid moving through said reservoir. A control circuit energizes the heater element with a voltage to heat the heating element and the fluid passing from the inlet to the outlet through the reservoir.

19 Claims, 19 Drawing Sheets

Related U.S. Application Data continuation-in-part of application No. 11/928,738, filed on Oct. 30, 2007, now Pat. No. 7,857,238, which is a continuation-in-part of application No. 11/341,116, filed on Jan. 27, 2006, now Pat. No. 7,588,194, which is a continuation-in-part of application No. 10/894,266, filed on Jul. 19, 2004, now Pat. No. 7,641,131.

(60) Provisional application No. 60/952,036, filed on Jul. 26, 2007, provisional application No. 60/551,571, filed on Mar. 9, 2004.

(51) Int. Cl.
  *B60S 1/46* (2006.01)
  *B05B 1/24* (2006.01)
  *F16L 53/00* (2006.01)
  *B05B 9/00* (2006.01)

(56) References Cited

U.S. PATENT DOCUMENTS

| | | | |
|---|---|---|---|
| 4,508,957 | A | 4/1985 | Rocchitelli |
| 5,012,977 | A | 5/1991 | Karlins et al. |
| 5,354,965 | A | 10/1994 | Lee |
| 5,509,606 | A | 4/1996 | Breithaupt et al. |
| 5,927,608 | A | 7/1999 | Scorsiroli |
| 5,957,384 | A | 9/1999 | Lansinger |
| 6,029,908 | A | 2/2000 | Petzold |
| 6,032,324 | A | 3/2000 | Lansinger |
| 6,133,546 | A | 10/2000 | Bains |
| 6,164,564 | A | 12/2000 | Franco et al. |
| 6,257,500 | B1 | 7/2001 | Petzold et al. |
| 6,364,010 | B1 | 4/2002 | Richman et al. |
| 6,465,765 | B2 | 10/2002 | Katayama et al. |
| 6,601,776 | B1 | 8/2003 | Oljaca et al. |
| 6,615,438 | B1 | 9/2003 | Franco et al. |
| 6,669,109 | B2 | 12/2003 | Ivanov et al. |
| 6,789,744 | B2 * | 9/2004 | Bissonnette et al. .......... 239/135 |
| 6,892,417 | B2 | 5/2005 | Franco et al. |
| 6,952,524 | B2 | 10/2005 | Bissonnette et al. |
| 7,108,754 | B2 | 9/2006 | Franco et al. |
| 7,128,136 | B2 | 10/2006 | Gregory |
| 2002/0137455 | A1 | 9/2002 | Ivanov et al. |
| 2003/0042328 | A1 | 3/2003 | Wojan et al. |
| 2003/0141381 | A1 | 7/2003 | Bissonnette et al. |
| 2003/0222156 | A1 | 12/2003 | Bissonnette |
| 2004/0170411 | A1 | 9/2004 | Kuebler et al. |
| 2004/0197094 | A1 | 10/2004 | Amberg |
| 2004/0226127 | A1 | 11/2004 | Kaplan |
| 2005/0083638 | A1 | 4/2005 | Warren et al. |
| 2005/0086758 | A1 * | 4/2005 | Arkashevski et al. ..... 15/250.02 |
| 2006/0124761 | A1 | 6/2006 | Shank et al. |
| 2006/0196448 | A1 | 9/2006 | Hayworth et al. |
| 2007/0284457 | A1 | 12/2007 | Shank et al. |

FOREIGN PATENT DOCUMENTS

| | | |
|---|---|---|
| FR | 2763549 | 11/1998 |
| GB | 2253339 | 9/1992 |
| WO | WO97/46431 | 12/1997 |
| WO | WO98/58826 | 12/1998 |
| WO | WO02/092237 | 11/2002 |
| WO | WO 2005076735 A2 * | 8/2005 |

OTHER PUBLICATIONS

Jacobs Electronics Safe-Vue Heater Brochure, pp. 1-4, at least asearly as Jun. 28, 2002.

1 page Valeo OPTI-Wash spec sheet, date unknown.

3 page website, www.aaro.ca/BreakingNews/Sep26-Oct17-01NwsBfs.html, posted Oct. 1, 2001.

4 page installation and owner's manual, Safe-Vue Heater, kit # 250-6652, Rostra Precision Controls, Inc. (1999).

1 page website, www.buyhotshot.com/choos.asp?ins=2, (Jan. 2003).

4 page website, www.buyhotshot.com/faq.asp?ins=8, (Jan. 2003).

Bennett, "Hot water clears icy windshields," 2 pages, Free Press, date unknown.

2 pages website, www.theautochannel.com/news/2001/09/20-29185/html, "Valeo Maximizes Driver Visibility with OPTI-Wash Heater Wash System" (Jun. 2003).

1 page website, www.ai-online.com/issues/article_detail.asp?id=22, (Jun. 2003).

European Search Report (6 pages) for International Application No. PCT/US2008/007878, mailing date Aug. 28, 2013.

* cited by examiner

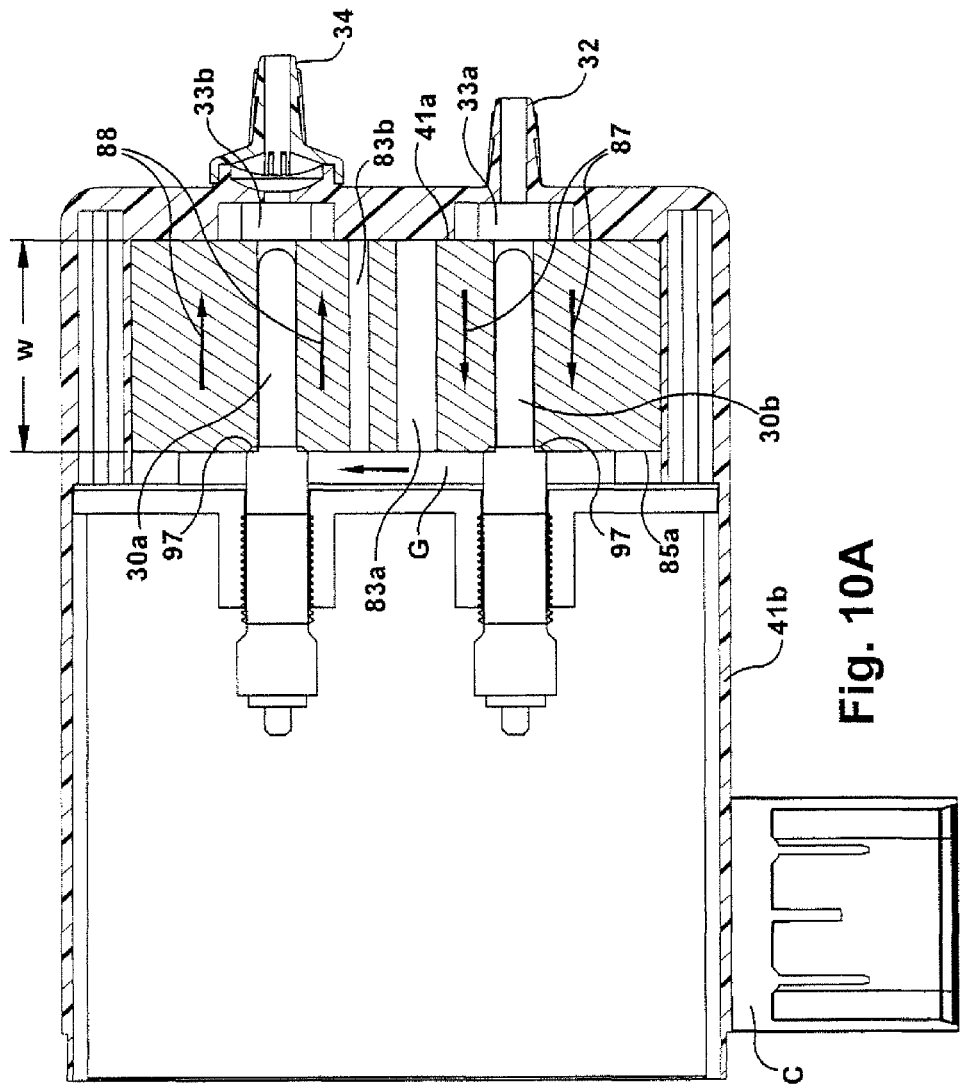

VEHICLE WINDSHIELD CLEANING SYSTEM

RELATE BACK

The present application is a divisional patent application claiming priority to U.S. patent application Ser. No. 13/414,912, filed Mar. 8, 2012 which is a divisional patent application claiming priority to U.S. patent application Ser. No. 12/393,111 entitled "Vehicle Windshield Cleaning System", filed Feb. 26, 2009 which is a continuation in part of application Ser. No. 11/928,738 filed Oct. 30, 2007 which claims priority from provisional application Ser. No. 60/952,036, filed Jul. 26, 2007 and is also a continuation in part of co-pending application Ser. No. 11/341,116 filed Jan. 27, 2006 which is a continuation in part of application Ser. No. 10/894,266, filed Jul. 19, 2004 (claiming priority from provisional application Ser. No. 60/551,571, filed on Mar. 9, 2004), all of which are incorporated herein by reference and from which priority is claimed.

FIELD OF THE INVENTION

The present invention concerns a windshield cleaning system, and more particularly to a windshield cleaning system that heats cleaning fluid applied to the windshield.

BACKGROUND ART

U.S. Pat. No. 6,364,010 entitled "Device to Provide Heated Washer Fluid" to Richman et al. concerns an apparatus and method for improving the cleaning and deicing effectiveness of a washer fluid in a motor vehicle before spraying it against a windshield, headlamps, etc, and utilizes the heat from the engine coolant to elevate the temperature of the washer fluid. U.S. Pat. Nos. 5,957,384 and 6,032,324 also concern de-icing of a windshield.

SUMMARY OF THE INVENTION

The invention concerns apparatus and method for providing a large amount of heated cleaning fluid to a vehicle surface. An exemplary system has an inlet port for receiving an amount of fluid; an outlet port for dispensing an amount of heated fluid; a heating element that heats up fluid passing from the inlet to the outlet; and a control circuit for energizing the heating element with a voltage to heat the fluid passing from the inlet to the outlet.

In one exemplary embodiment, the system provides heated cleaning fluid to a vehicle surface and includes structure defining an inlet port for receiving an amount of fluid, an outlet port in fluid communication with a reservoir for dispensing an amount of heated fluid.

These and other objects advantages and features of the invention will become better understood from the following detailed description of one exemplary embodiment of the present invention which is described in conjunction with the accompanying drawings.

BRIEF DESCRIPTION OF THE DRAWINGS

FIG. 10A is a view as seen from the line 10A-10A in FIG. 9;

EXEMPLARY EMBODIMENT FOR PRACTICING THE INVENTION

The drawings depict embodiments of the present invention that concern a washer control system 10 for use with a vehicle. In the disclosed embodiments of the invention, the control system 10 is used in conjunction with a windshield washer apparatus. The control system 10 includes a control circuit 14 that includes an electronic output drive signal circuit 20 and an input signal interpretation or conditioning circuit 16.

Figure 2:
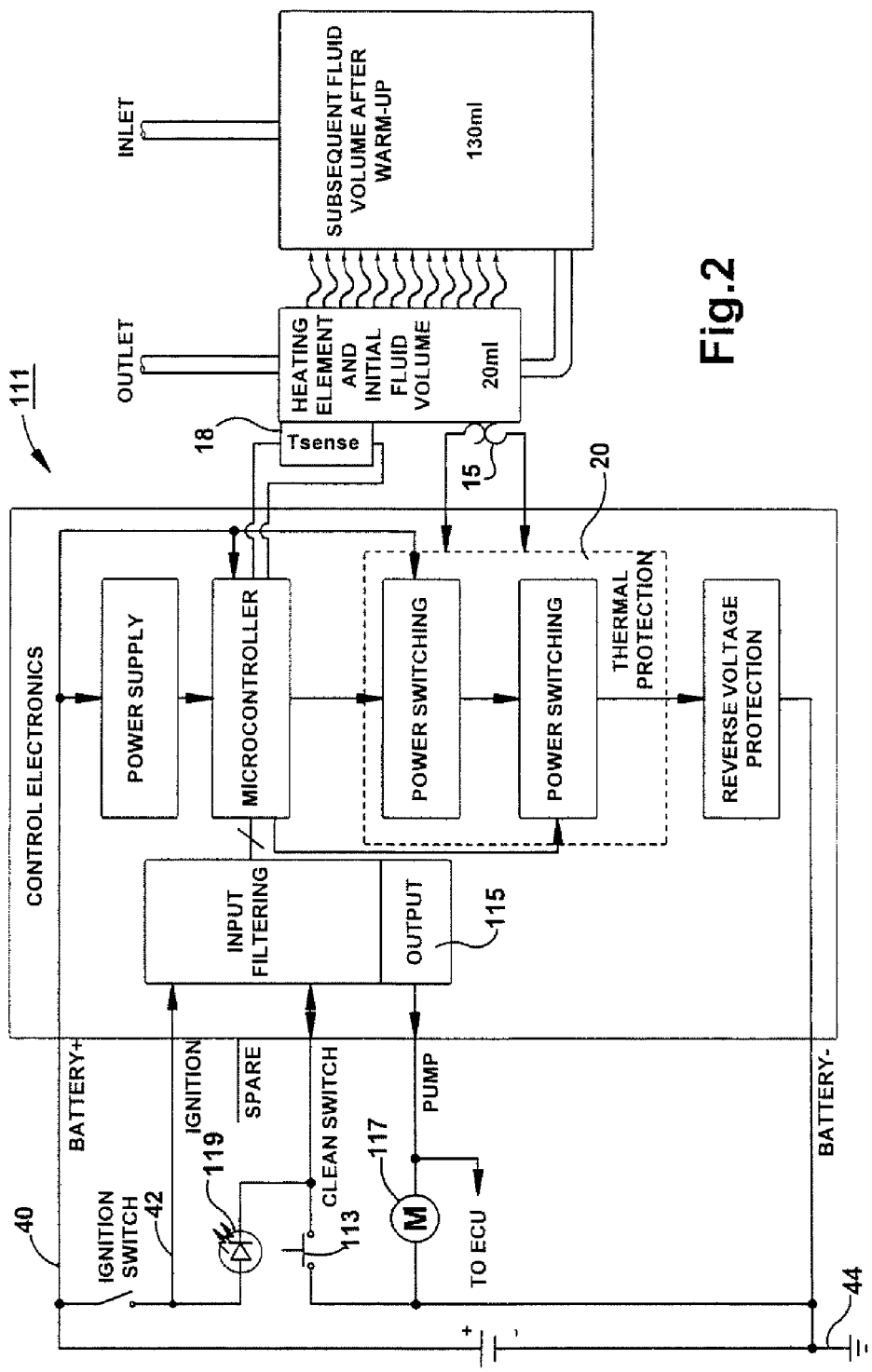
FIG. 2 is an alternate block diagram schematic of a representative system for use with the present invention.

The input signal interpretation circuit 16 electronically interfaces with at least one temperature sensor 18. In one embodiment of the invention, the temperature sensor provides signals related to the temperature of washer fluid supplied to windshield spray nozzles on the vehicle. In one embodiment of the invention, the control system also includes an electronic output circuit that drives an output power control for at least one heating element that heats the windshield washer fluid. One exemplary control system could have both "high side" and "low side" type drives working together as illustrated in FIG. 2. An alternate control system is a "low side" type drive, meaning the module activates and deactivates the heater element by controlling the electrical circuit path to ground. Another alternate control system could have an output drive that is a "high side" type, meaning the module activates and deactivates the heater element by controlling the electrical circuit path to a power source. In accordance with another alternate control system, an electrical interface coupled to a vehicular communication bus allows the control system to be controlled by vehicle communications and makes data available to the vehicle for operation and diagnostics of the control system.

The control circuit 14 includes a programmable controller or microprocessor 14a that implements control algorithms for washer heater control output functions in response to vehicle input signals. As seen in the functional schematic of FIG. 1, the control system 10 includes an electronic output 12 from the control circuit 14 for providing controlled current to the heating element 30. Heating element 30 may be composed of a single heating element or multiple heating elements. By selecting heater current draw and power rating the heating time and total system current draw can be modified over a wide range of operating parameters based on individual vehicle requirements, ie. electrical power available. The control circuit 14 also includes an input signal interpretation circuit 16, or interface, to monitor input signals from, as one example, the temperature sensor 18. The temperature sensor 18 provides signals that allow for control of the amount of power delivered to the heating element 30. The controller monitors inputs from a vehicle battery 40 and vehicle ignition 42. It is understood that a separate ignition input 42 may not be required if all power is obtained from the battery input 40. In accordance with another alternate embodiment as illustrated in the functional schematic of FIG. 2, the controller also monitors a user input and drives a vehicle washer fluid pump 45a (FIG. 8) having a pump motor.

Figure 8:
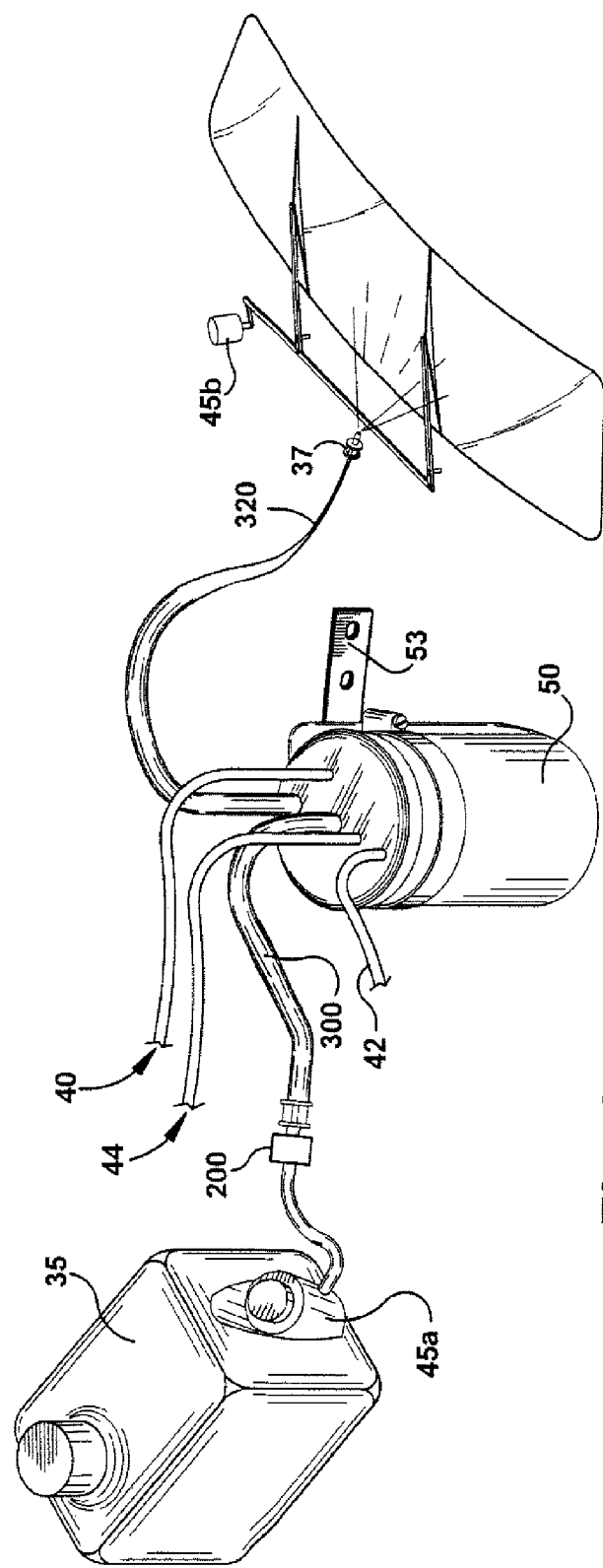
FIG. 8 is a perspective view of a heating assembly coupled to a fluid pump.
Figure 9:
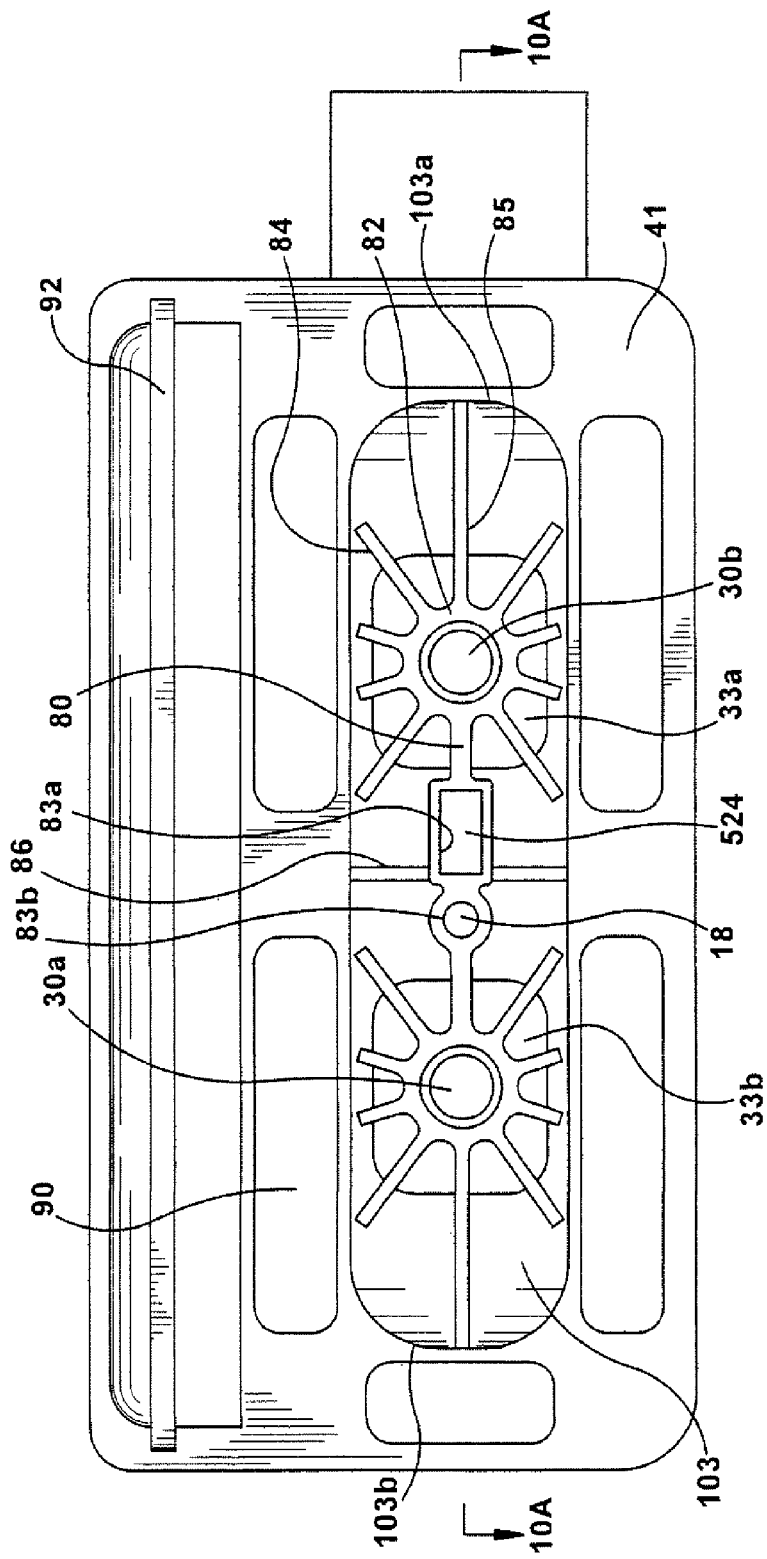
FIG. 9 is a plan view of an exemplary heating canister constructed in accordance with the invention.
Figure 10:
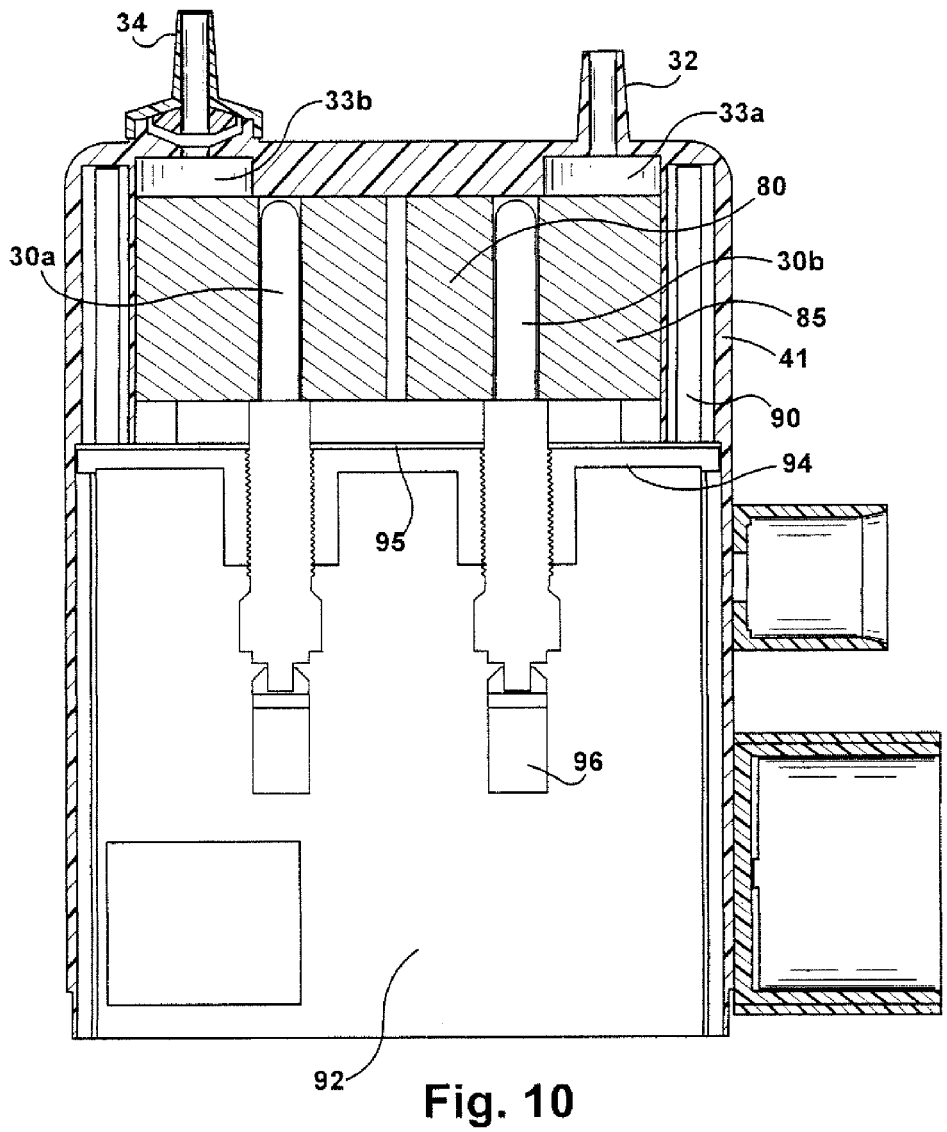
FIG. 10 is a section view of a canister having two glow plugs and inlet and outlet ports spaced to the side.

In one exemplary embodiment, the electronic output circuit 20 controls power coupled to a heater element 30 (FIG. 1) that includes two glow plugs 30a, 30b (FIG. 10), or other heating element equivalents such as nichrome wire, ceramic heaters, or any metallic or non-metallic type heater mounted in thermal contact with a heat exchanger 80 as shown in FIGS. 9 and 10. Fluid is routed past the heat exchanger 80 in thermal contact with these elements by routing fluid into an inlet 32 and forcing the fluid out an outlet 34 having a check valve to prevent fluid leaving the outlet 34 from re-entering a fluid reservoir 103. The checkvalve could be positioned on the inlet 32. The inlet receives washer fluid from a fluid reservoir 35 (FIG. 8) of a motor vehicle and the outlet 34 delivers heated washer fluid to nozzles 37 (FIG. 8) mounted to the vehicle which direct the washer fluid against the vehicle surface, typically a windshield, headlamps etc. In the exemplary embodiment the heating elements 30a, 30b are glow plugs. FIGS. 9 and 10 depict an exemplary embodiment of a housing 41 that defines a fluid reservoir 103 that surrounds the heat sinks. The housing 41 is constructed from plastic, or other material with favorable thermal characteristics.

The programmable controller 14 (FIG. 1) constructed in accordance with the exemplary embodiment of the invention implements control algorithms for washer heater control output functions in response to vehicle input signals. As washer fluid temperature changes due to ambient temperature changes, battery voltage changes, and the like, the duration of applied heat is increased or decreased in order to maintain a washer fluid at or near a target temperature. Control of the heating may also include redundant failsafe mechanisms such as a thermal fuse 524 (FIG. 9).

Controller Schematics

Figure 1:
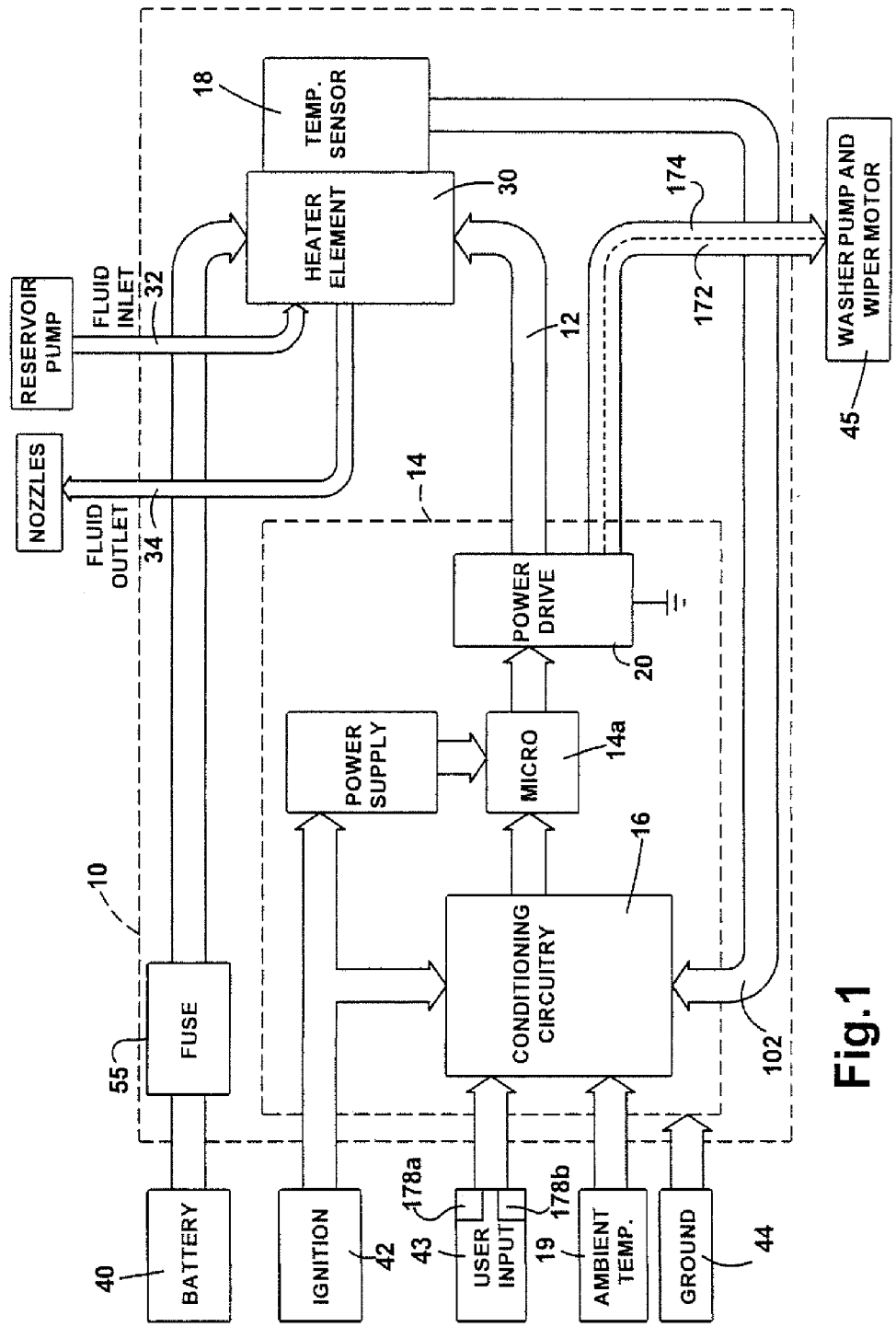
FIG. 1 is a block diagram schematic of a representative system for use with the present invention.
Figure 4:
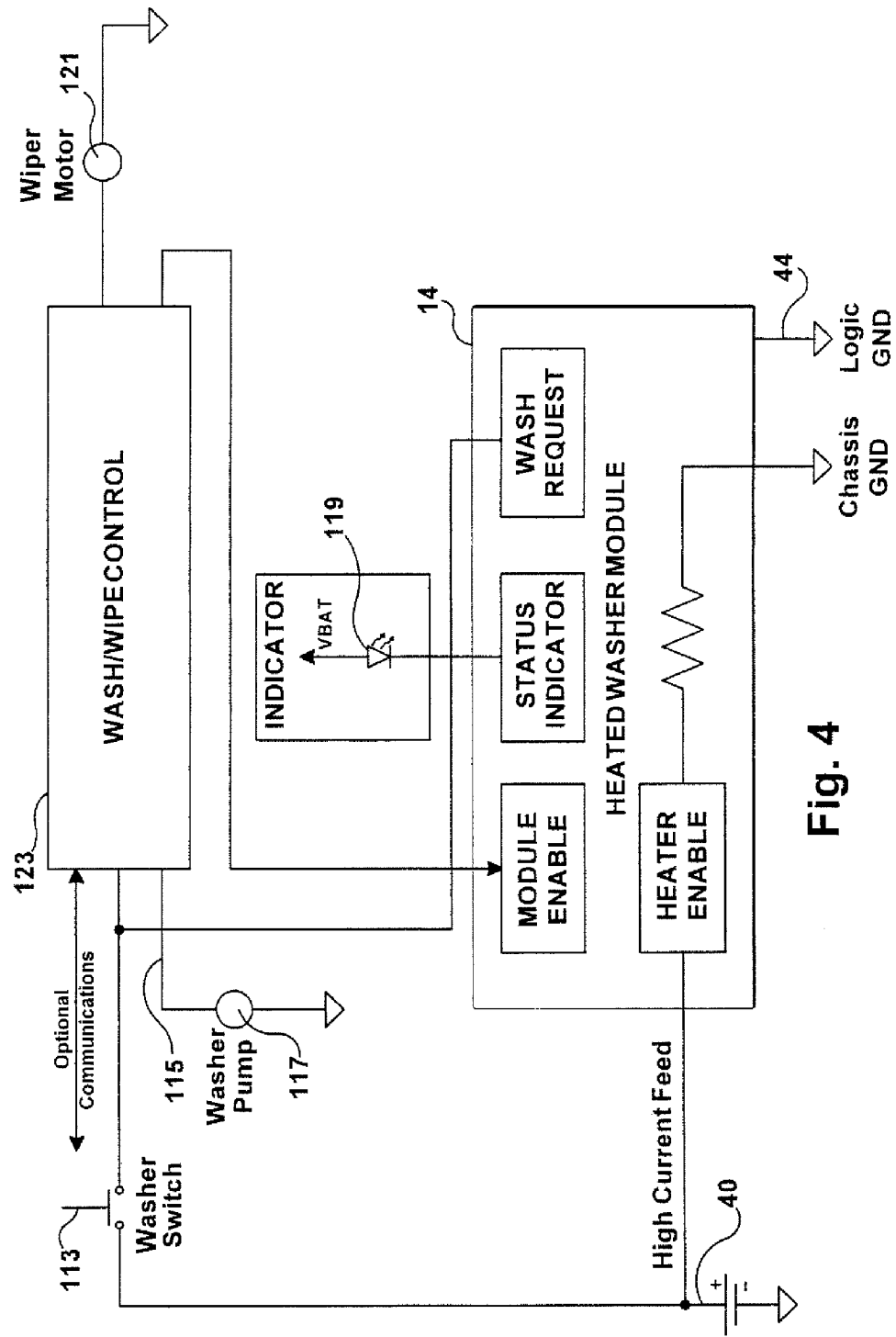
FIGS. 4-7 are schematic depictions of control circuits for use with a washer control system constructed according to an alternative embodiment of the present invention.

The block diagram shown in FIG. 1 and the more detailed schematic of FIG. 4 depict operation of a control system 10 having external electrical connections, which include Battery 40, Ground 44, and Ignition 42. The system block diagram 111 shown in FIG. 2 shows further external electrical connections including a user operated Clean Switch 113 and an output 115 to drive a vehicle washer pump motor. The Battery input connection 40 provides the voltage supply needed by the control system 10. This connection allows the high current flow required by the heating element. The Ground connection 44 provides the current return path to the battery negative terminal. This ground connection allows the high current flow required by the heating element plus the requirement of the control system 10. An Ignition input 42 provides power to the controller. It is understood that separate ignition input 42 may not be required if all power is obtained from battery input 40. The battery voltage is monitored by the controller 14 to determine if there is sufficient voltage present to allow the control system to operate.

The input 102 from the temperature sensor 18 in physical contact with the heat exchanger 80 is directly related to washer fluid temperature. Washer fluid temperature is monitored by using a temperature sensor such as a thermistor, RTD, or the like. The washer fluid is monitored non-invasively by attaching the temperature sensor to the heater. Alternatively, the fluid temperature could be monitored invasively by placing a temperature sensor directly into the fluid through a threaded fitting or other suitable attachment method.

Operation

Figure 3:
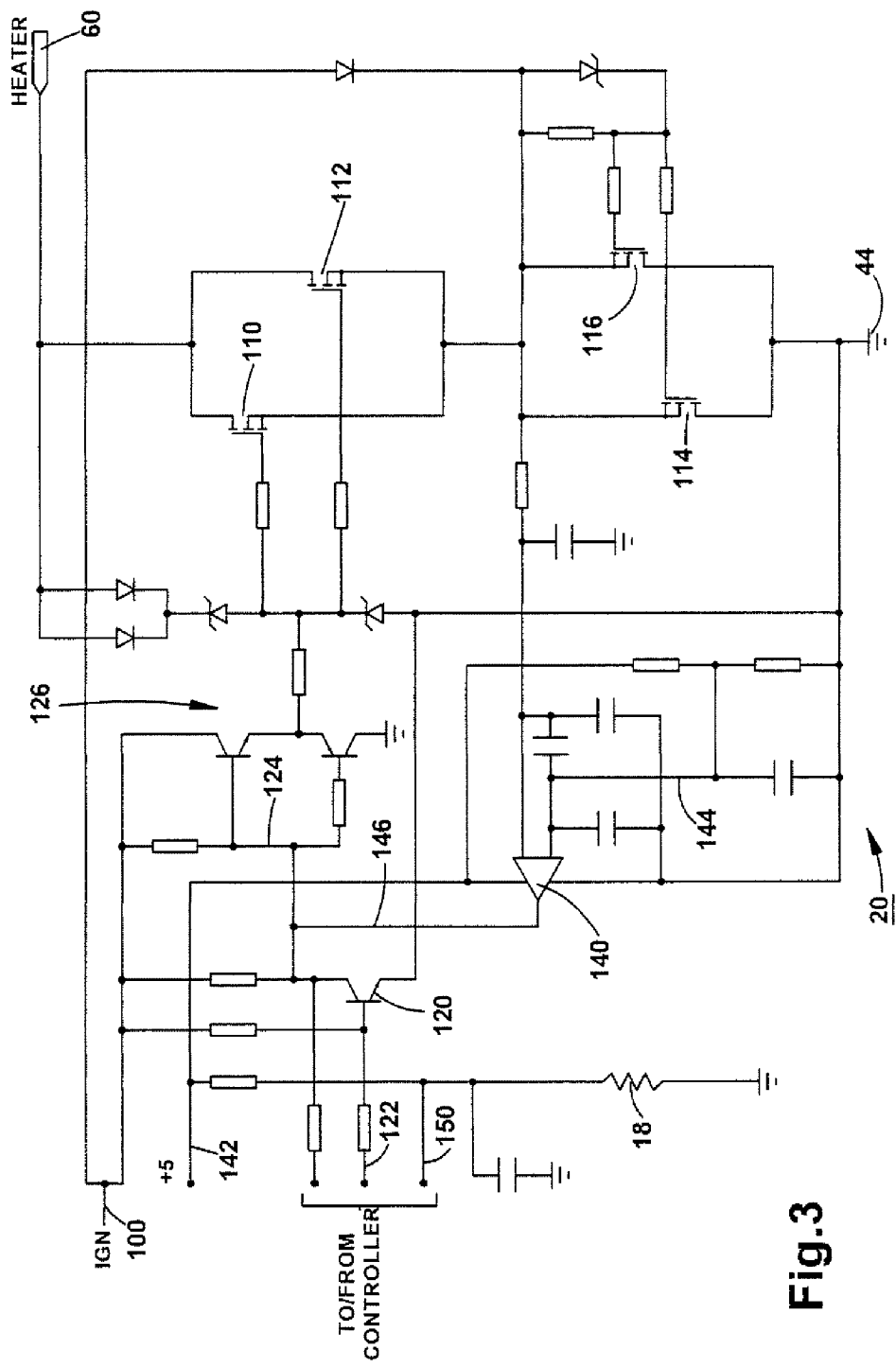
FIG. 3 is a schematic diagram of a drive circuit coupled to a fluid heating element that forms part of the FIG. 2 system.

The controller receives a wake-up command signal from the Ignition input 100 (FIG. 3). When the Ignition input is above a predetermined voltage, the controller 14 drives the heater element 30 if the following are true:

1. The ignition voltage is greater than a first predetermined level and less than a second predetermined level.
2. The sensed Heater element temperature is less than a predetermined level. Cleaning the windshield with warmed fluid can be accomplished by the following:
   a. Application of ignition 42 will cause the unit to heat the volume of fluid. During the heating time an indicator LED 119 flashes. Alternately, the LED could remain off until the fluid has been heated at which time the LED will turn on either 100% or flashing. The LED is shown as part of the clean switch 113, but a skilled artisan could move the indicator external to the switch.
   b. During heating of the fluid if the clean switch 113 is pressed, the LED will begin flashing to confirm the operator's desire to use smart mode. If heating has already completed and the indicator lamp is illuminated (not flashing), momentarily activating the clean switch 113, initiates a smart mode consisting of the energization of a washer pump and wiper motor. During heating
   c. Output 115 activates the washer pump 117 to dispense fluid on the windshield. In the embodiment shown in FIG. 4, an external controller 123 activates a wiper motor 121 in response to a signal from the washer switch 113. One skilled in the art could have the same controller 14 activate the wiper motor 121 and the washer pump 117.
   d. Hot fluid will be sprayed on the windshield and the windshield wipers will cycle automatically, when the hot fluid reduces to a predetermined temperature or time, output 115 deactivates, thus completing the smart mode and washer spray/wiper cycling will halt. Momentarily pressing clean switch 113 during the smart mode will cancel the operation. The cleaning switch can be configured to heat fluid to a predetermined temperature (or time) and dispense and reheat and dispense fluid multiple times.
2. With ignition 42 applied and when indicator 119 is illuminated (not flashing) indicating warm fluid is available, the activation of the existing vehicle wash switch will dispense fluid for as long as the switch is closed for on-demand cleaning.

3. The activation of the existing vehicle wash switch will dispense fluid for as long as the switch is closed for on-demand cleaning regardless of fluid temperature.

An output driver 20 depicted in FIG. 1 and FIG. 2 applies power to the heater after starting the heating cycle. The output driver will then begin applying power to the heater to maintain the temperature of the fluid. A fuse 55 is located between the battery connection and the heater element external to the housing 50 in the illustrated embodiment as shown in FIG. 8. An alternative embodiment could have the fuse 55 internal to the housing as shown in FIG. 1. In the exemplary embodiment of the invention, the desired heater temperature is predetermined to be in a range between 120 and 150 degrees Fahrenheit. Placing the temperature sensor 18 in physical contact with the heating element and maintaining the heater temperature at a temperature at or below 150 degrees Fahrenheit prevents the heating element from heating the cleaning fluid to an undesirable temperature, such as boiling. This helps prevent the formation of mineral deposits that could potentially clog the nozzle 37 (FIG. 8). As depicted in FIG. 9 if the temperature sensor 18 is not mounted directly on the heating element, but is rather located in the fluid reservoir 103, only an approximate, latent measurement of the heating element temperature is sensed. This would allow the heat exchanger 80 to heat to a temperature that is hotter than the desired fluid temperature in reservoir 103 and potentially cause the formation of nozzle clogging mineral deposits. The output driver 20 (FIGS. 1, 2) will remain active as long as the ignition voltage is above a predetermined voltage and the heater temperature is below the desired heater temperature as determined by the temperature sensor 18. When the ignition 42 is turned off, the controller is deactivated.

FIG. 3 depicts one implementation of the output circuit 20. A heater connection 60 is shown in the upper right hand portion of the FIG. 3 depiction. This connection is grounded by means of initiating conduction of two power Field Effect Transistors (FET) 110, 112 which provide a current path to ground from the heater connection 60 to the ground connection 44 through a pair of reverse polarity protection FET transistors 114, 116. The two transistors 110, 112 are turned on or rendered conductive by means of a pre-drive transistor 120 that is coupled to an output 122 from the microprocessor controller 14a (FIG. 1). First consider a high signal from the controller 14a at this output 122. This turns on transistor 120 that pulls an input 124 of a totem pole transistor combination 126 low. This signal turns on a lower of the two transistors of the totem pole combination to send an activation signal that turns off the two FETs 110, 112.

When the controller provides a low output from the controller 14a at the output 122, the transistor 120 turns off and pulls an input 124 to a totem pole transistor combination 126 high. This signal turns on an uppermost of the two transistors of the totem pole combination to send an activation signal that turns on the two FETs 110, 112.

In the illustrated embodiment, a comparator 140 monitors current through the transistors 114, 116 (and by inference the transistors 110, 112) and deactivates the transistors in the event too high a current is sensed. A five volt signal that is supplied at an input 142 from a power supply (FIG. 1) provides a reference input 144 to the comparator 140. When the non-reference input exceeds the reference input due to a rise in the current through the transistors 110, 112 (and associated rise in the voltage across the transistors 114, 116) the output 146 of the comparator goes low and removes the input from the gate of the FETs 110, 112 that causes them to conduct. This low signal at the output 146 is also coupled to the controller so that the controller can respond to the over current condition.

In accordance with the exemplary embodiment of the invention a thermistor temperature sensor 18 is also coupled to the controller. A signal at a junction between the temperature sensor 18 and a resistor coupled to the five volt input 142 generates a signal at an input 150 related to the temperature of the heater element 30 (FIG. 1).

Referring to FIG. 9, in one embodiment, the control circuit 14 is mounted to a printed circuit board 92 supported by a housing 41. As seen in FIG. 3, a connector 60 is a bent metallic member that attaches to the heating element 30 in the vicinity of the printed circuit board 92 and is in physical contact with the circuit components on the printed circuit board. The connector 60 thereby not only acts as a path to ground for current passing through the heating element 30 but acts as a heat sink that transmits heat away from the printed circuit board.

The exemplary control circuit includes a microcontroller as shown in FIG. 1 running at an internal clock frequency of 4.0 Megahertz. In the exemplary embodiment, the microcontroller 14a selectively energizes the heating element 30 based on a voltage applied to the control circuit. This voltage may be the battery voltage 40 and/or the ignition voltage 42. When the ignition input voltage is applied, the control circuit will power up, come out of reset, and wait for a start delay time imposed by the controller to allow the vehicle's electrical system to become stable. After this start delay, the control circuit monitors the ignition voltage to determine if the ignition is above a minimum enable voltage. A temperature signal from the sensor 18 is also monitored to see if the temperature of the fluid is below a set point temperature. An output drive feedback signal is also monitored to ensure that the output is in the correct state. If all conditions are such that the output can be enabled, the output 122 (FIG. 3) to the transistor 120 is pulled low. This initiates fluid heating. Initially, the output drive is on 100% for a maximum on time or until the feedback temperature reading approaches a set point temperature. In one embodiment, a preset maximum on time is empirically derived to stay below the boiling point of the cleaning fluid. Subsequently the control will read the heating element 30 temperature and make a determination if power should be reapplied. If the sensed temperature is below the desired setpoint, the output will be re-enabled at a variable duty cycle so that the heating element 30 is heated to the setpoint goal temperature as quickly as possible without exceeding a maximum allowable overshoot temperature.

Normal operation consists of maintaining the fluid temperature at the desired setpoint temperature by varying the duty cycle at which voltage is applied across the heating element 30. The output duty cycle changes based on how far the sensed temperature is below the set point temperature.

In the event of excessive current flow through the power drive 20, the output 12 will automatically be disabled. In this event the signal at the output 146 from the comparator 140 (FIG. 3) will go low. When this occurs the controller 14a disables the output to the transistor 120 for a period of time equal to an output retry rate programmed into the controller 14a. If the fault condition is removed, normal operation of the temperature set point control is re-instituted. An alternate embodiment could have the current sense capability implemented by the comparator 140 omitted.

In the event the operating voltage from the battery (and ignition) is too high or too low ($\geq 16.5$ and $\leq 8$ volts respectively) the controller 14a disables the output 12 for a timeout period. After the timeout period, if voltage conditions are within normal parameters, the controller again enables the output. It is understood that the operating voltage range can be set to whatever voltages are required for a particular application. The exemplary system also incorporates a soft turn-on and turn-off of the heating element. The soft turn-on and turn-off is accomplished by a slow ramp up or down of the output 20 that drives the heating element. The ramping of power reduces the amount of flickering that can be observed from the vehicle headlights. It is recognized that the FET drivers could be run linearly to accomplish the soft turn-on and turn-off of the heating element. It is also recognized that the FET drivers could be run linearly to regulate the temperature of the heating element. It is further recognized that if the FET drivers are run linearly they will produce quantities of heat that will aid in the heating of fluid in the system.

Figure 5:
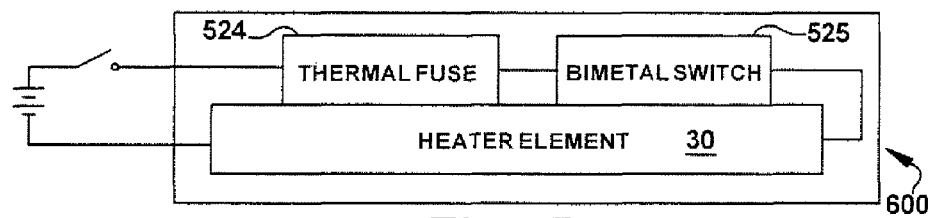
Figure 6:
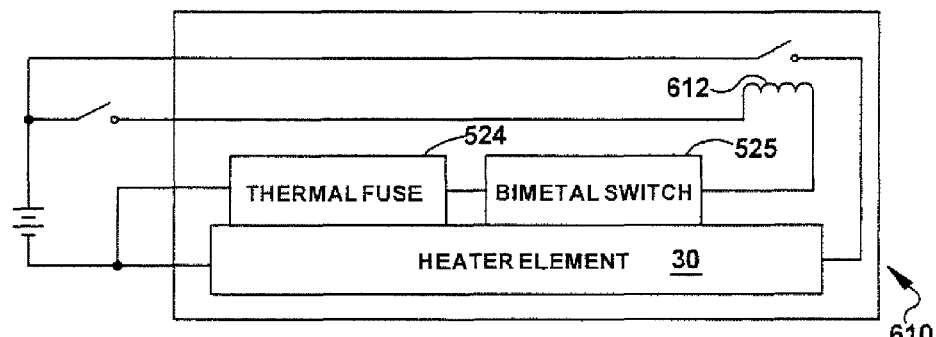

FIGS. 5 and 6 illustrate an embodiment of a washer control system 10 that is different from that described previously due to the replacement of control circuit 14 with a thermal fuse device 524 and a bi-metal device 525. FIG. 5 is a schematic depiction of such a control circuit. The thermal fuse 524 prevents the washer control system 10 from overheating, while the bi-metal device 525 regulates heating during operation. The bi-metal device could control a relay 612 (see control circuit schematic of FIG. 6) that supplies power to the heating element. In addition, at least one temperature sensor could be used in conjunction with a reference to control a relay that supplies power to the heating element.

Figure 7:
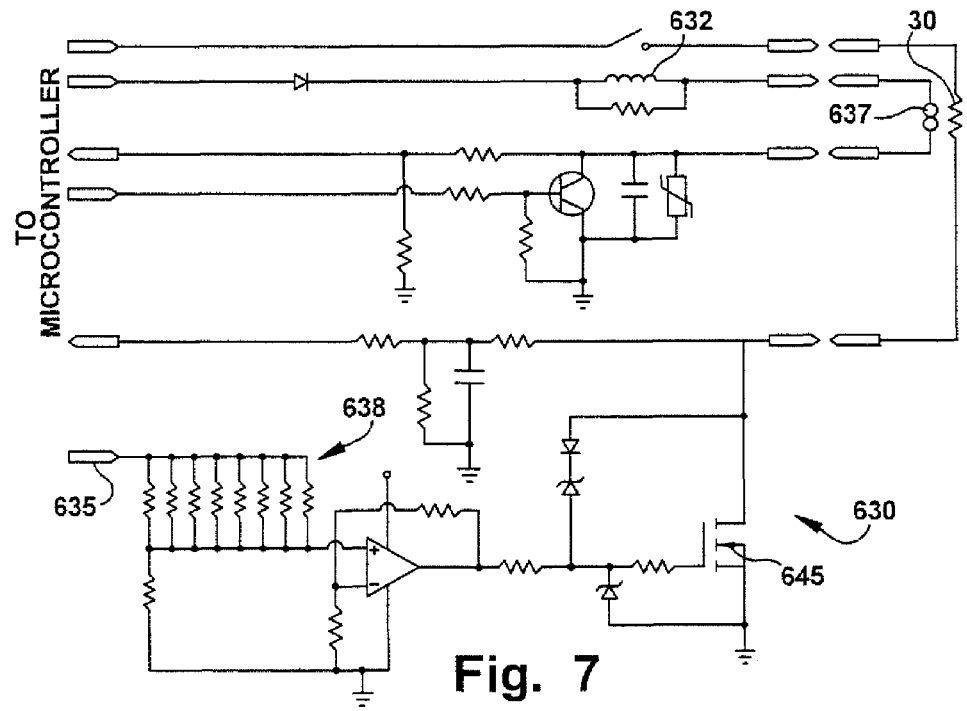

In FIG. 7, the heater 30 is energized with battery voltage by a relay 632 that is activated by ignition of the vehicle. A thermal fuse 637 is in series with the relay coil and is in proximity to the heater 30. If the heater becomes too hot, the thermal fuse 637 will open and voltage is removed from the heater. The control circuit 14 shown in FIG. 1 provides a digital signal to a heater energization circuit 630 shown in FIG. 7. A digital signal 635 from the controller is converted to an analog voltage by a converter circuit 638. The converted voltage is provided to a FET 645 as a gate voltage. The gate voltage varies between zero to a FET saturation voltage. The FET 645 is part of a current path for the heater 30 and dissipates an amount of heat that is proportional to the driving voltage that is supplied to it. Since battery voltage is monitored, and the resistance of the heater is known, current flowing through the heater can be calculated by the control circuit 14 to set and regulate the gate voltage. By controlling the relative amounts of power dissipated in the FET and heater, the control circuit can apply varying amounts of current to maintain a desired fluid temperature. By controlling the rate of rise and fall a soft turn an/off can be achieved.

FIGS. 9 and 10A illustrate an exemplary fluid heating assembly that provides a heated cleaning fluid to a vehicle surface. A plastic housing 41 defines an interior elongated reservoir 103 and has an inlet port 32 on one side of the housing for routing fluid into the reservoir from an external source. A connector C extends from a bottom 41b of the housing 41 when the housing is mounted within the engine compartment of a motor vehicle. The housing further has an outlet port 34 in fluid communication with the reservoir 103 for dispensing an amount of heated fluid to a nozzle for spraying heated fluid from the reservoir onto a surface such as a windshield. The port 32 is generally circular in cross section to mate with a hose coupled to a source of fluid. The port 32 opens outwardly to a region having a greater cross section than the port 32 which is bounded by four generally orthogonal walls to define an entryway 33a for fluid to flow through on its way to contacting an aluminum heater exchanger 80 positioned to the side of the entryway 33a.

The aluminum heat exchanger 80 has struts 85 of a length to extend from one end wall 103a to the other end wall 103b of the reservoir and fits within and is supported by the plastic housing in a position that is at least partially covered by fluid within the reservoir 103. First and second transversely spaced generally circular hub segments 82 are coupled together by an intermediate bridging segment that supports a sensor 18 and the thermal fuse device 524 in passages 83a, 83b that extend completely through the heat exchanger. Each hub supports multiple fins 84 that extend outwardly from its associated hub and have a width W the same as the struts 85 to increase the surface area of the heat exchanger and promote heat transfer to the fluid in the reservoir. The heat exchanger 80 may also be made out of other thermally conductive materials such as copper. The heat exchanger is coated to prevent oxidation or reaction with fluids. In the preferred embodiment it is a PTFE penetrated hardcoat anodization.

First and second glow plug heater elements include first and second glow plugs 30a, 30b for heating fluid that passes from the inlet 32 to the outlet port 34 through the reservoir 103 in contact with the heat exchanger 80. The glow plug heater elements axially extend into the hubs of the heat exchanger so that heat emitting surfaces of the glow plugs (NSN: 2920-01-188-3863) are bonded to interior curved surfaces of the hubs by a thermally conductive material to transmit heat to the heat exchanger. The glow plug heating elements are coupled at one end with generally conductive connector plates 96 for routing energizing signals to the glow plugs. Inside the reservoir, the heat exchanger hubs butt against shoulders 97 which extend outwardly a slightly greater amount than the outer diameter of the heat conveying surface of the glow plugs to maintain a gap G between an edge of the heat exchanger fins and struts and allows fluid to flow around a wall or barrier 86 which extends to an edge 85a of the strut from a wall 41a of the housing and that roughly divides the reservoir into two halves.

The combination of the interior reservoir 103 of plastic housing 41 and heat exchanger 80 with struts 85 and multiple fins 84 form a fluid path from inlet port 32 to outlet port 34. The fluid path is formed by the combination of the wall 86 that is generally centered in the reservoir 103 and struts 85 and fins 84. As fluid enters reservoir 103 the fluid stream is divided into two halves by the strut 85. Each of the two fluid streams flows through the reservoir in the direction of the arrows 87 along respective sides of the heat exchanger 80 in an essentially parallel path until the two streams combine to flow beneath the wall 86, then again separate into two portions and flow in the direction of the arrows 88 to arrive at the region 33b near the outlet port 34 where the two fluid streams are combined into a single stream. In the embodiment shown in FIG. 9 fluid exits the housing through an exit region 33b also having four walls through which fluid flows on its way to the circularly shaped exit port 34.

Experience shows that thermal transfer from the center glow plug hubs is adequate if fluid flow is symmetrical about the hub center line (even flow past the fins). The fluid close to the center of the heat exchanger has a fairly short path from inlet to outlet. This does not give a significant amount of time to have the fluid absorb the full amount of heat available. FIG. 10 shows inlet and outlet ports moved to the outside ends of the reservoir. This reduces some of the effectiveness of heat transfer from the heat sink but it allows the fluid to stay in the reservoir for a longer time thus allowing more heat transfer to take place.

Figure 18:
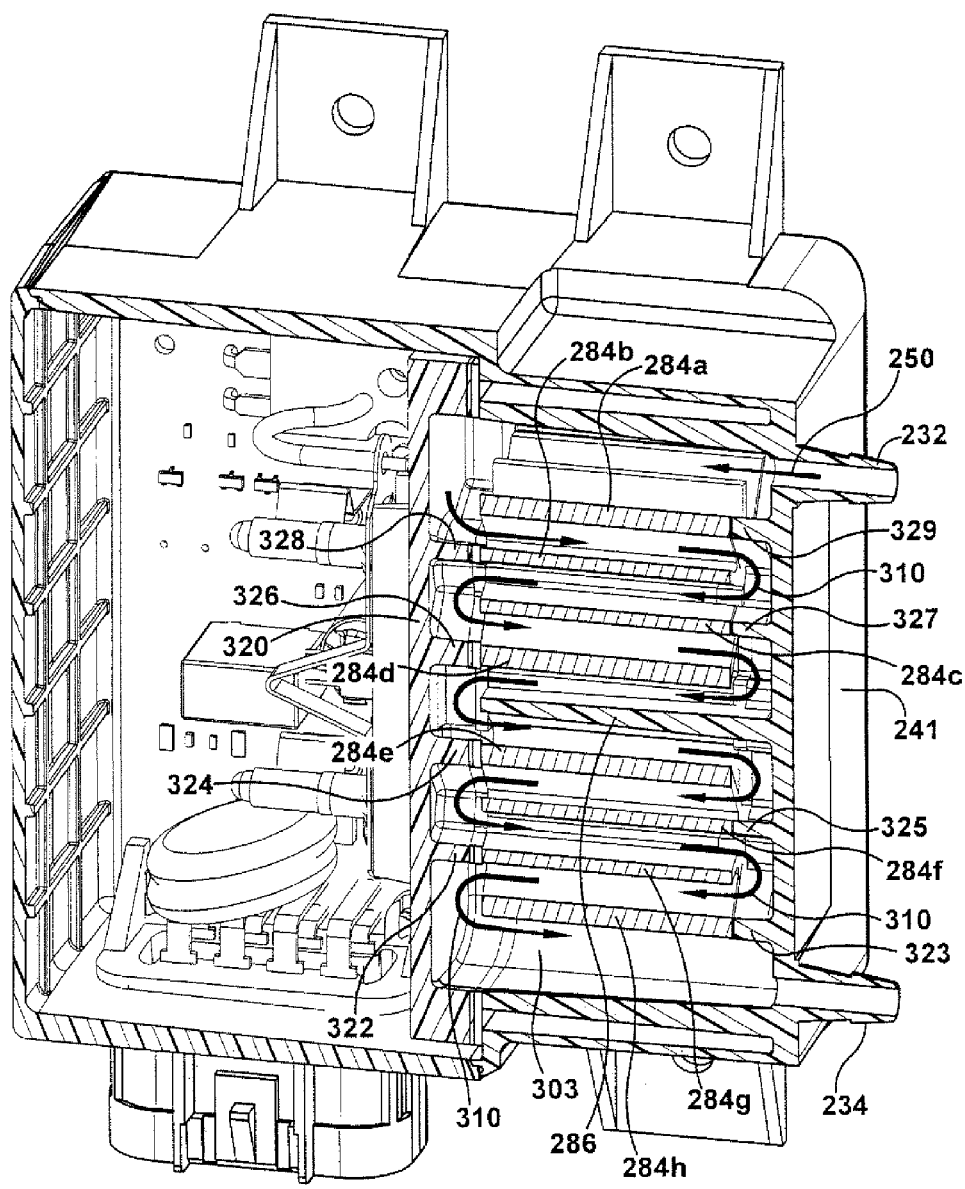
FIG. 18 is a perspective view of a heater assembly employing a heat sink and glow plug heating elements supported in a reservoir.
Figure 20:
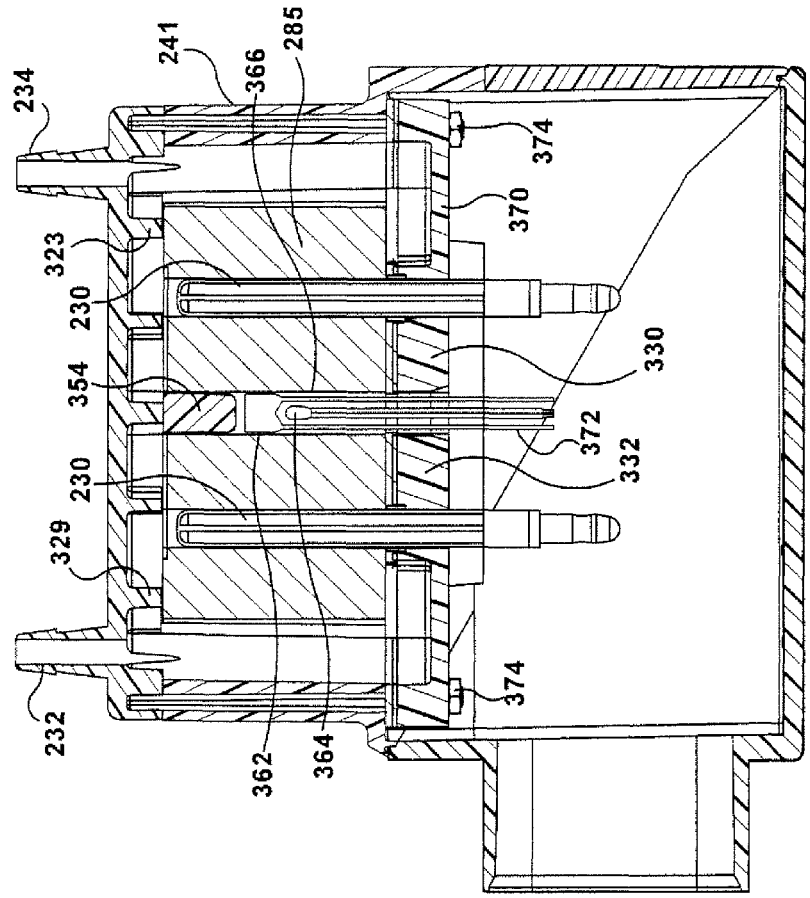
FIG. 20 is a section view as seen from the plane 20-20 in FIG. 19.
Figure 19:
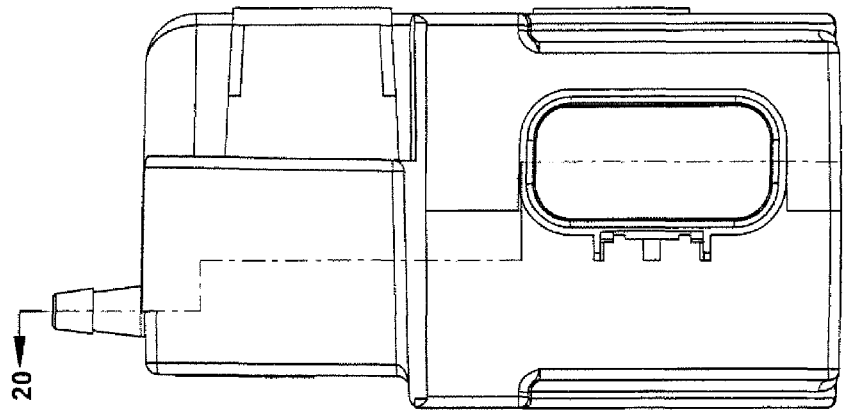
FIG. 19 is a side plan view of a housing supporting glow plugs and heat sink for heating fluid entering the housing.
Figure 21:
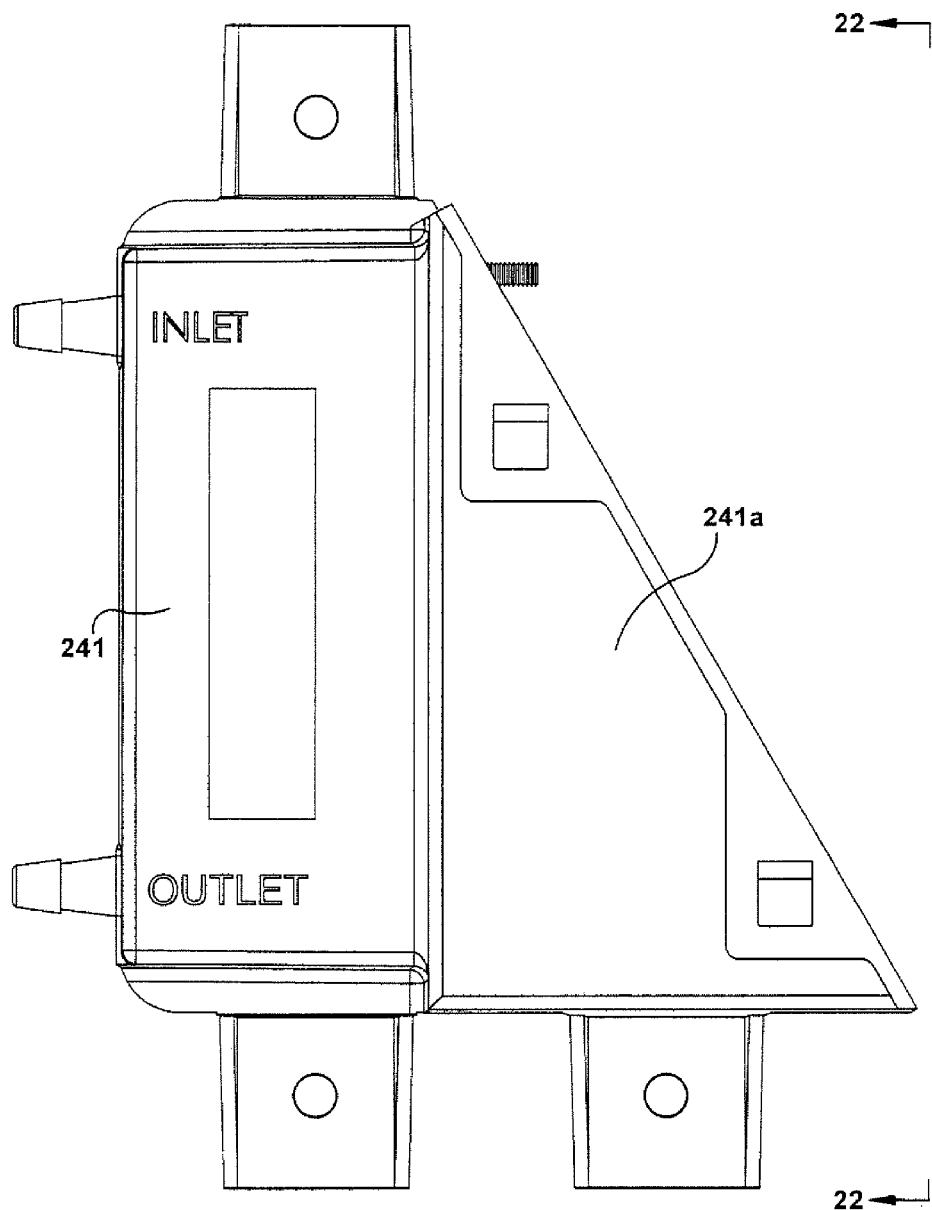
FIG. 21 is a depiction of one housing portion of the FIG. 19 housing showing mounting flanges.

FIGS. 18-24 show a housing wherein fluid enters an inlet and follows a serpentine or back and forth path while extracting heat from an aluminum heat exchanger 280. The fluid enters the housing 241 through the inlet port 232 and flows in the direction of an arrow 250 along the respective sides of the heat exchanger 280 eventually reaching outlet port 234. Fins and housing details of a part 241a of the housing that bounds a reservoir 303 force the fluid to flow along one or the other side of a strut 285a in two fluid streams. FIG. 18 depicts fluid flow on one side of the strut 285a as it flows in a serpentine pattern designated with arrows 310 first flowing along and around a fin 284a and then along and around the next fin 284b. Once the fluid has flowed around the four fins 284a-d attached to the first generally circular hub segment 282a it is forced over a wall feature 286 that is part of plastic housing part 241a and defines in part the reservoir 303. The fluid then continues transversing in a serpentine pattern along and around the next four fins 284e-h that are attached to the second generally circular hub segment 282b. The two fluid streams on opposite sides of the housing come to a second strut 285b and then combine as the streams arrive at outlet port 234.

Some benefits of the fluid path technique shown in FIGS. 18-24 are large heated surface area to fluid volume ratio, extending duration of fluid to heat exchanger contact time, reduction of mixing of cold fluid with heated fluid, and lower flow restriction from inlet to outlet.

In the disclosed embodiment, the fins 284a-h and struts 285a,b as well as the hub segments 282a,b of heat exchanger 280 provide a large heated surface area of approximately 129 cm$^2$ and have a width of 35 mm. With a fluid volume of approximately 40 ml a high surface area to fluid volume ratio greater than 2.5:1 of surface area to volume results which provides for rapid heating of fluid and efficient transfer of heat from heating elements 230 supported within through passages 281 in the spaced apart heat exchanger hubs 282a, 282b. The serpentine path of approximately 356 mm causes the fluid to remain in contact with the heat exchanger 80 for a longer duration of time. Without the serpentine path, the fluid would only travel approximately 76 mm from inlet to outlet not allowing adequate time to take full advantage of the transfer heat from heat exchanger 280. The serpentine fluid path also provides for better separation of cold inlet fluid from fluid that is heating or that has already been heated.

Figure 22:
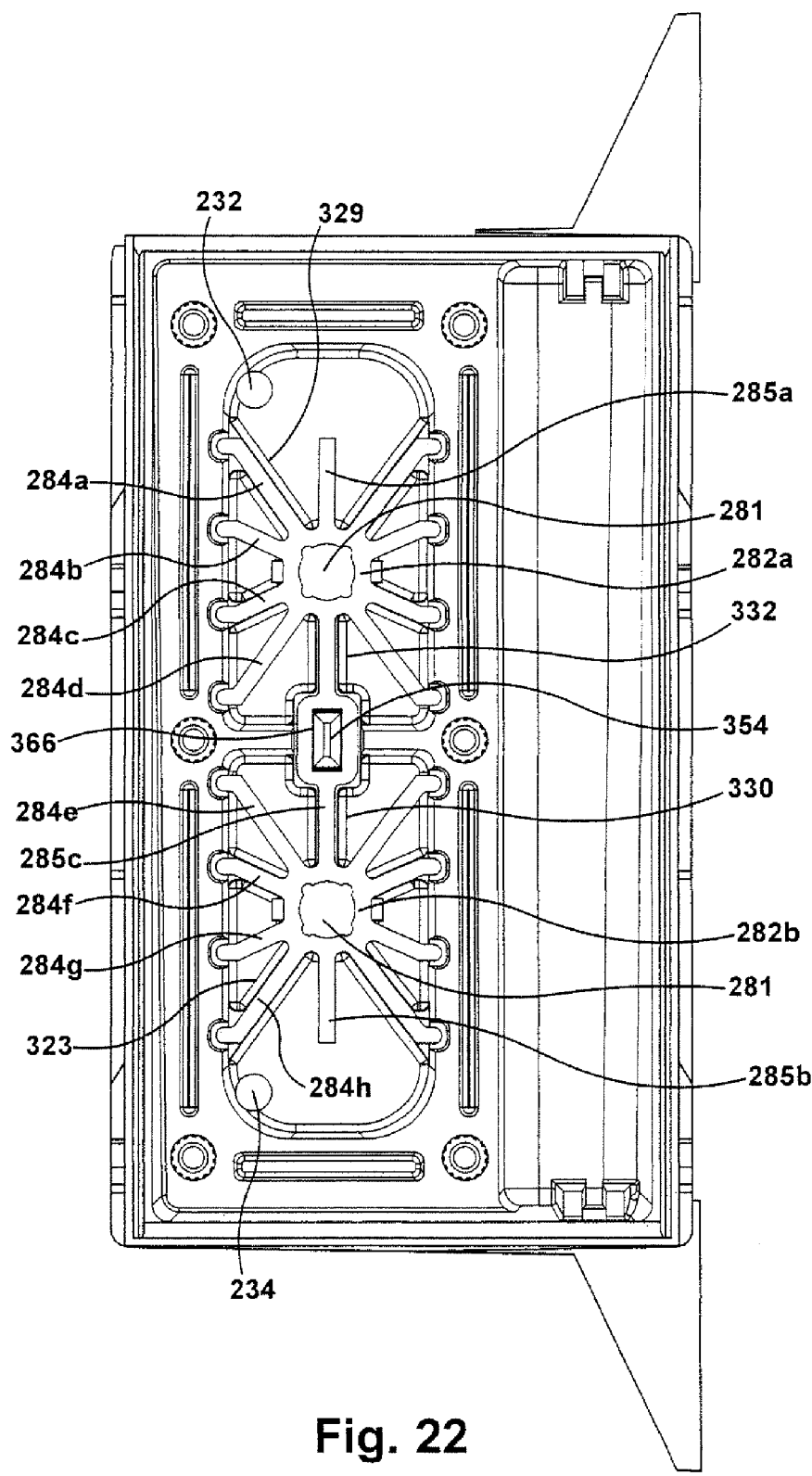
FIG. 22 is a plan view of the reservoir with a cover removed to show the position of an inlet and outlet.

The heat exchanger fins 284 mate with corresponding lands or raised portions that extend inwardly from interior walls of the housing. Thus, for example the fin 284a at the end of the housing nearest the inlet port contacts a land 329 which prevents fluid from entering the reservoir and flowing at right angles away from the inlet to the outlet. The sectioned perspective view of FIG. 18 illustrates other lands 322-329 engaging ends of the fins of the heat exchanger. An intermediate or mid section 285c of the strut engages additional lands 330, 332 of the housing that block passage of the fluid from one side of the strut to the other as the fluid flows through the reservoir. As seen in the view of FIG. 22 the lands are slightly thicker than the fins. The fins are angled away from the hubs to slip between bounding walls that define slots 340 in the housing 241a into which the fins slip during fabrication.

The fins 284 provide a buffer against cold fluid readily mixing with previously heated fluid by forcing fluid to traverse the heat exchanger 280 in a series fashion, fin by fin, section by section. This allows fluid that has already been heated to be dispensed from the outlet port 234 with minimal impact from cold fluid coming from the inlet port 232. Fluid travels along each side of heat exchanger 80 with up and down direction changes. With parallel paths along both sides of the heat exchanger 280 a lower flow restriction is realized than the equivalent path of serpentine back and forth direction changes with no parallel path. This yields a lower flow restriction from inlet to outlet and provides for more efficient spraying of fluid.

Figure 23:
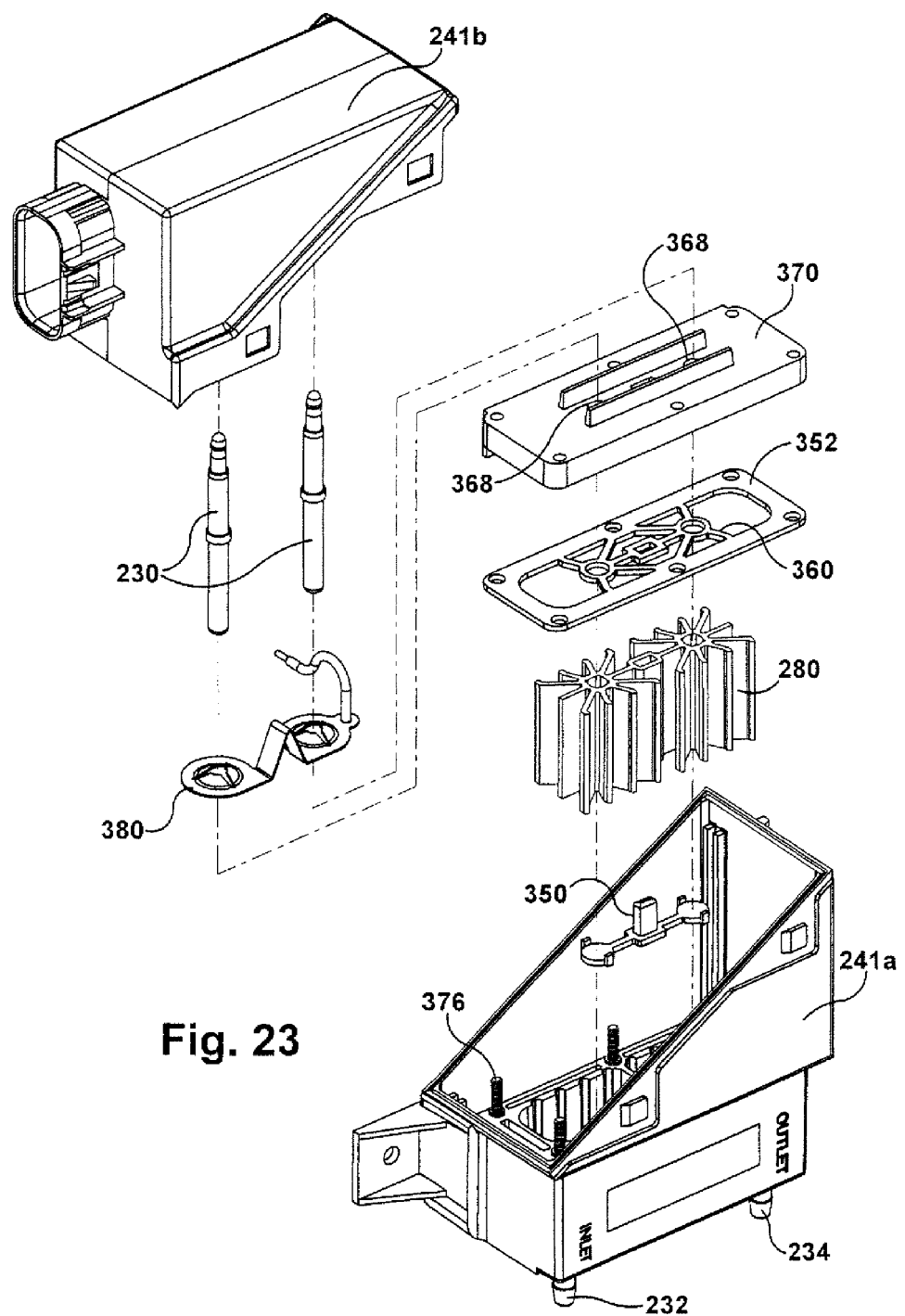
FIG. 23 is an exploded perspective view of the heater assembly of FIG. 18.
Figure 24:
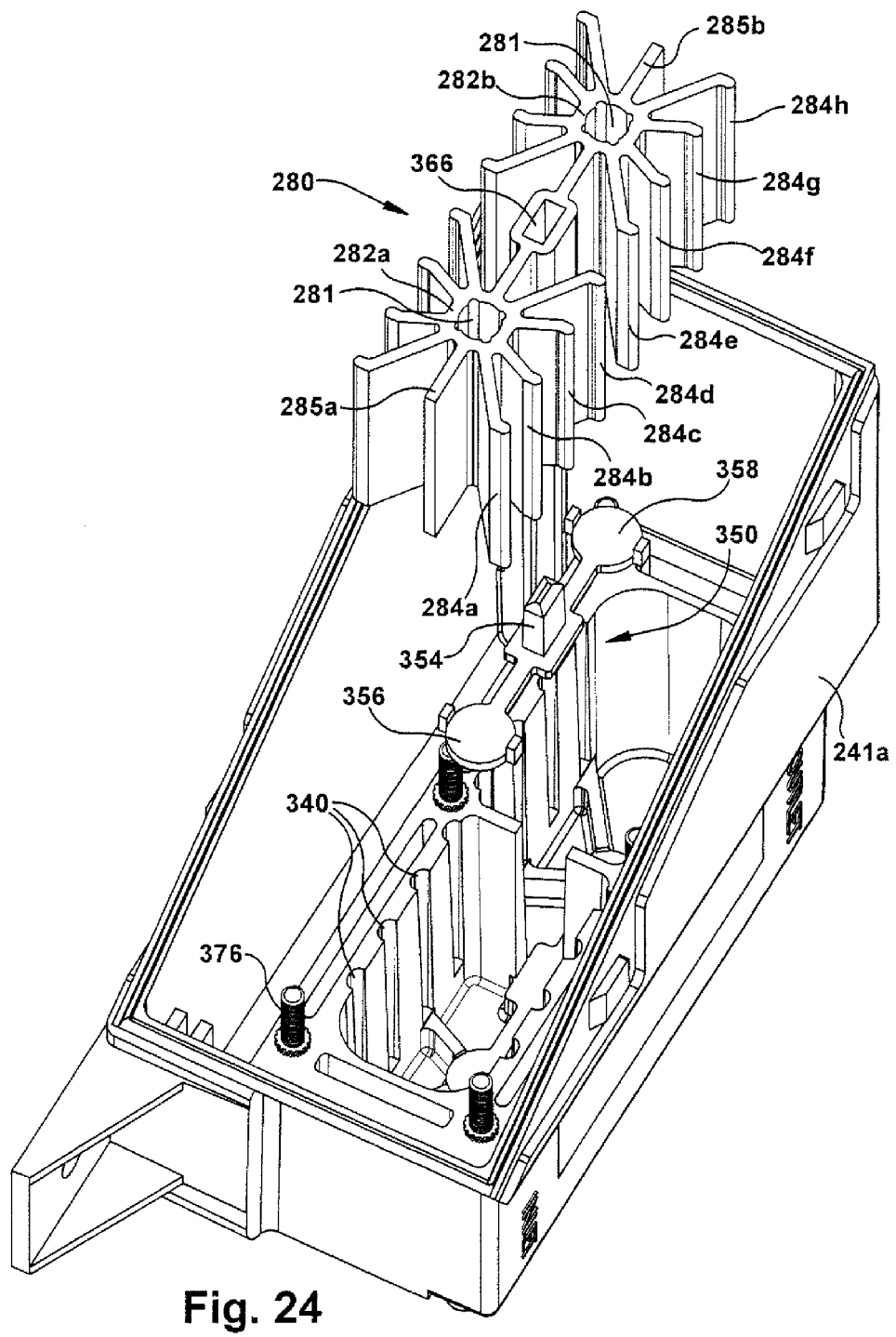
FIG. 24 is perspective view looking into a heating reservoir.

Glow plug heaters 230 fit into the passageways 281 bounded by the spaced apart hubs. Turning to FIG. 23, one sees two elastomeric seals 350, 352 are inserted into the housing 241a. A first seal 350 has a center boss 354 and two side lobes 356, 358. The second seal 352 defines traces 360 that mimic the orientation of the fins of the heat exchanger. During fabrication, the boss of the seal 350 is inserted into a center passageway before a temperature sensor (part number KC103G4K from US sensors) and thermal fuse (Part no. N6F from Tamura) 362, 364 are potted within a throughpassage of the heat exchanger in thermal contact with the interior walls of the throughpassage 366. The glow plugs 230 extend through openings 368 in a cover 370 that mates with the housing along an outer edge of the seal 352. The glow plugs are also potted within the passageways extending through the hubs of the heat exchanger to assure good thermal contact between glow plugs and the heat exchanger. During fabrication of the assembly, the heat sink and seal are inserted into the reservoir by slipping the fins into the slots 340. The seal glow plugs and electrical conductors 372 for the temperature sensor 364 and thermal fuse 362 extend through the seal 352 and cover for external connection to a controller mounted on a circuit board in the housing portion 241b. Connectors 374 engage threaded studs 376 to compress the seals 350, 352 and maintain a serpentine flow path of fluid entering the inlet 232. The two parts 241a, 241b of the housing mate along an angled edge of each housing. A ground connector 380 having a stud receiver type engagement with the glow plugs 230 is slipped over the glow plugs after the cover 370 is attached. Preferred glow plugs are part number NSN: 2920-01-188-3863 commercially available from WAP, Inc. The preferred potting material for the ends of the glow plugs is Arctic Silver 5 commercially available from Arctic Silver Incorporated and the sensor and thermal fuse is EP1200 commercially available from Resin Lab.

A control circuit supported by a printed circuit board 92 supported by the housing energizes the glow plugs with a voltage and thereby heats fluid passing from the inlet to the outlet through the reservoir. A plastic wall member 94 supported within the housing and has openings for accommodating corresponding first and second glow plugs. A seal 95 contacts the wall member and confines fluid to the reservoir by preventing fluid from leaking outward from the reservoir past the wall member. Air pockets 90 formed in the housing 41 surround the heat exchanger and provide insulation between the heat exchanger an the region outside the housing. These pockets also serve as freeze protection in the event water is frozen in the device. These air chambers allow the reservoir to expand with the freezing water. For optimal protection these chambers may be filled with a compressible material to control the freeze expansion performance. The air pockets 90 may be positioned to cover only a portion of the housing 41. Connectors route battery, ground and control signals to the control circuit mounted to the printed circuit board.

Figure 14:
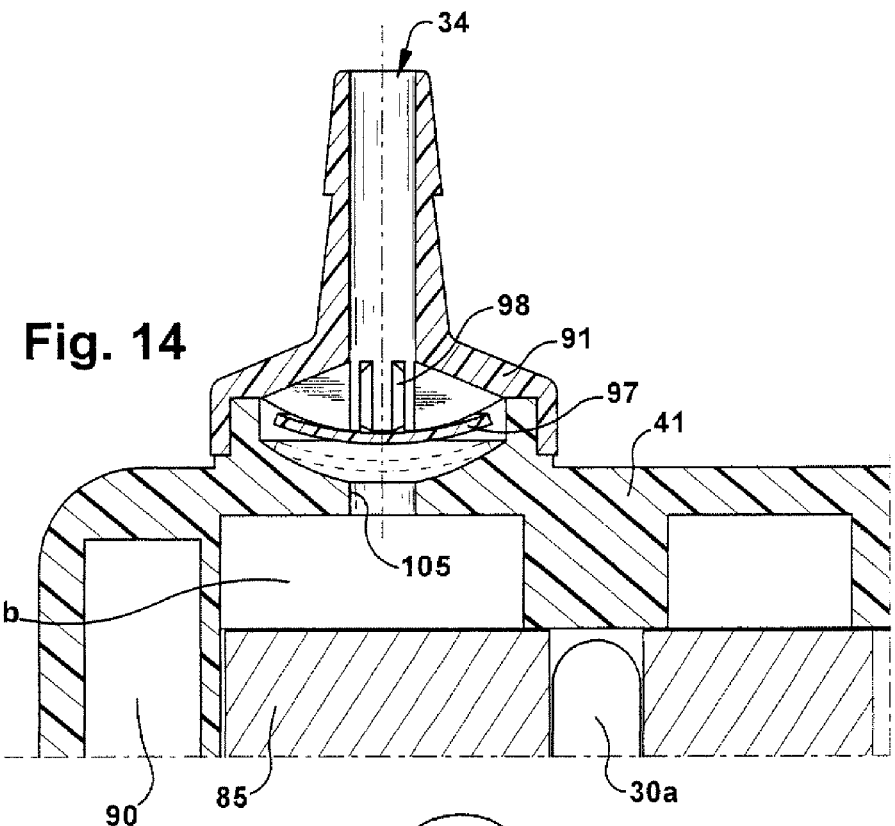
FIGS. 14 and 15 illustrate operation of a check valve for use with the invention.
Figure 15:
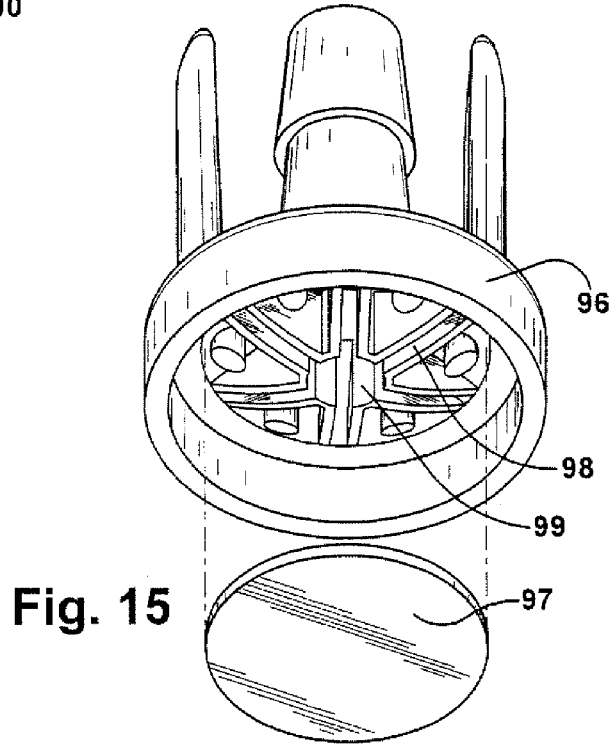
Figure 16:
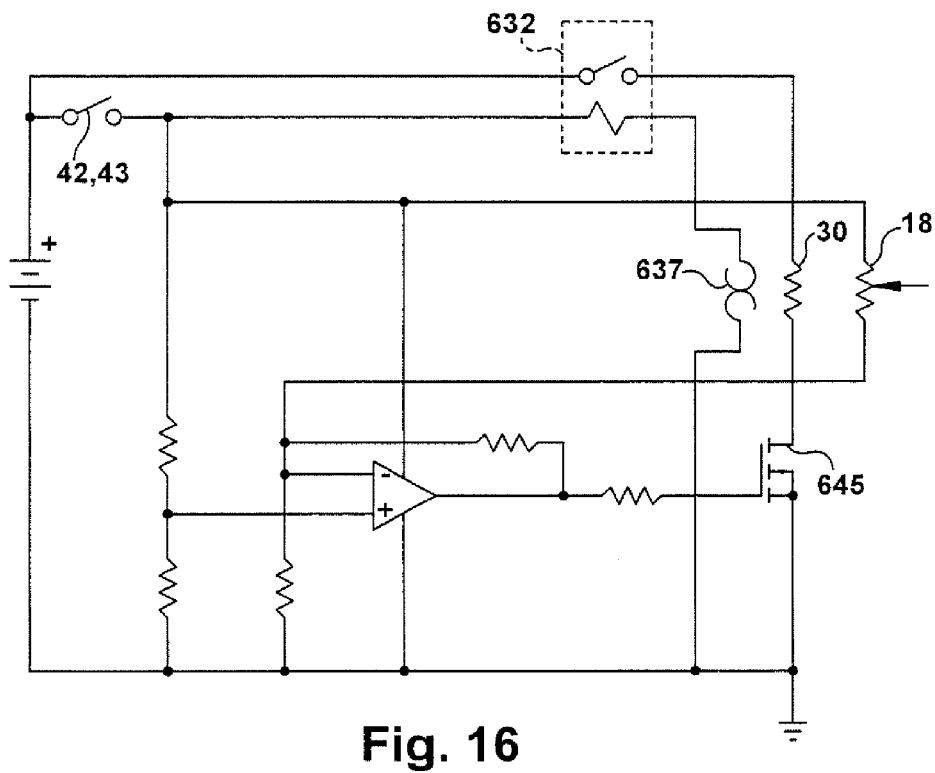
FIGS. 16 and 17 are schematic diagrams of a representative system for use with the present invention as shown FIGS. 9, 10 and 10A.
Figure 17:
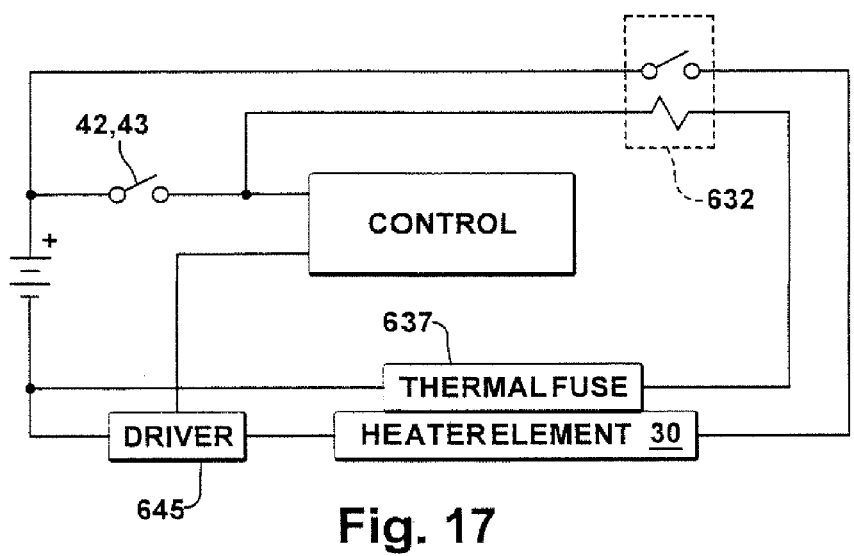

As depicted in FIGS. 14 and 15 the outlet 34 is defined by an end cap 91 and flexible membrane 97 coupled to the housing 41. The end cap includes a center throughpassage 99 that allows fluid to flow out the outlet to the nozzles. As fluid is forced through the reservoir, an elastomeric membrane 97 is forced against radially extending slots 98 which open into a central passageway 99. Once the pressure is removed from the reservoir by deactivating the washer pump the membrane 97 moves from the position shown in FIG. 14 to cover a narrow throughpassageway 105 to prevent fluid from flowing back into the reservoir from the nozzles.

Figure 11:
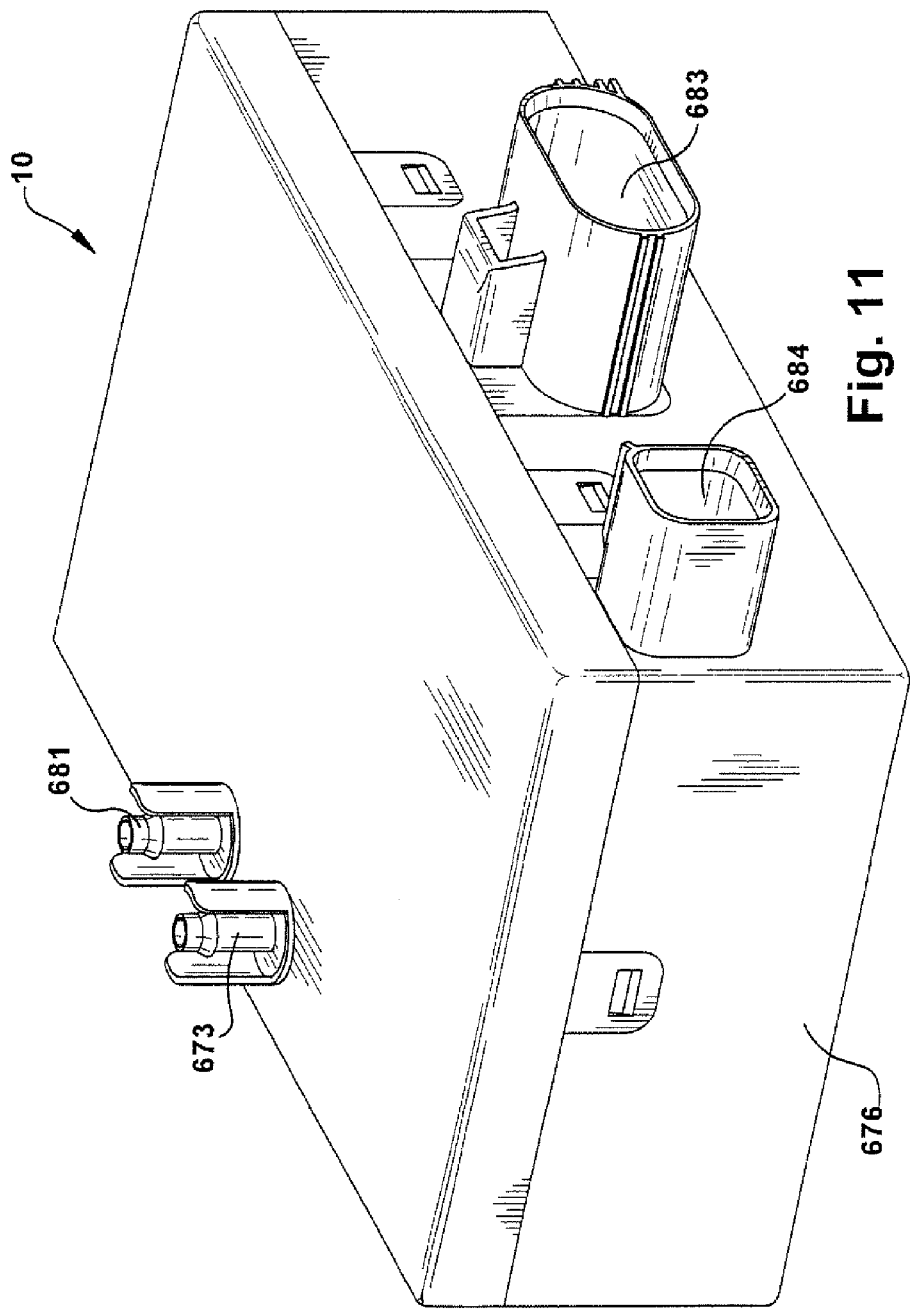
FIGS. 11, 12, and 13 depict an alternate embodiment of a fluid heating system.
Figure 12:
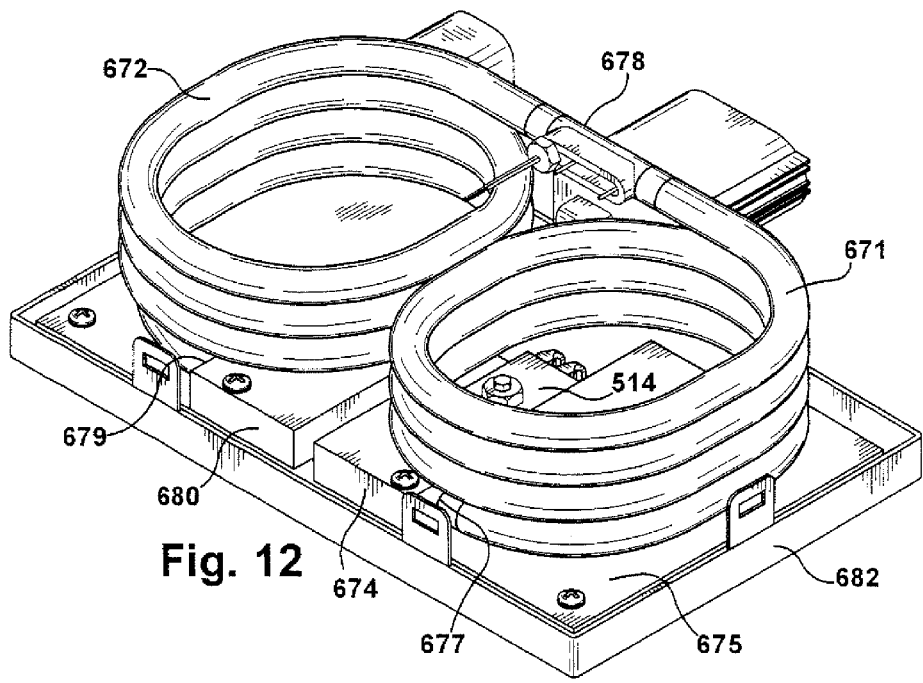
Figure 13:
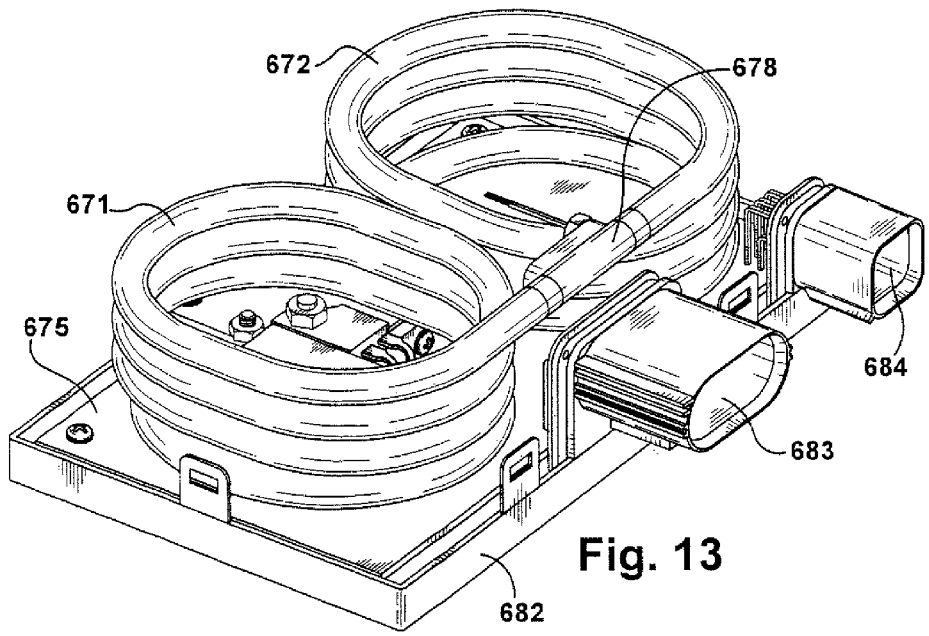

FIGS. 12-13 show the system with a cover component 676 removed. In this embodiment, control system 10 (FIG. 11) receives fluid through an inlet port 681 that then enters into a heatsink 674. A previously described power FET component is electrically and mechanically attached to printed circuit board (PCB) 675, using well known methods, and is joined with heatsink 674 by means of a threaded fastener or the like. The heatsink 674 is preferably made from copper, or alloy materials such as aluminum that are similarly effective in thermal transfer. The heatsink 674 is configured to contain a small volume of fluid, preferably situated directly opposite the flat mounting surface of a power FET, ideally for the purpose of cooling power FET during system operation. Conversely, heat transferring from power FET 514 through the heatsink 674 serves to heat the fluid in the reservoir area, adding to the performance of control system 10.

A heatsink 674 also provides electrical connection between the PCB 675 and a first heater coil 671 such as a coil that is depicted in U.S. Pat. No. 6,902,118 which is incorporated herein by reference. Fluid passes from heatsink 674 into first heater coil 671 through aperture 677, through temperature sensor fitting 678 and into second heater coil 672. Fluid dispenses into check valve block 680 through an entryway 679 and exits control system 10 by means of outlet port 673. A check valve block 680 also provides electrical connection between PCB 675 and second heater coil 672, and is preferably made from copper, or any alloy material capable of withstanding long term exposure to typical fluids used in vehicle washer systems. The assembly as described is preferably attached to base component 682 and enclosed in the cover 676 (FIG. 11), which are preferably molded from plastic material such as 30% glass reinforced polyester, such as that made by GE Plastics under the trade name Valox®. There are many other suitable materials available capable of withstanding the environment and conditions typical of those under a vehicle engine compartment. Power is supplied to this embodiment of control system 10 by means of a connector assembly 683, while input and output commands are administered by means of a connector assembly 684. Similar connector assemblies are used in the FIGS. 9 and 10 embodiment of the control.

While the invention has been described with a degree of particularity, it is the intent that the invention includes all modifications and alterations from the disclosed design falling within the spirit or scope of the appended claims.

The invention claimed is:

1. A fluid heating assembly for providing a heated cleaning fluid to a vehicle surface comprising:
   a) a housing extending in a first direction defining two interior chambers spaced from each other in a second direction perpendicular to the first direction in a side-by-side configuration by a separating wall extending in the first direction, said housing including an inlet port in fluid communication with one of said interior chambers defining a first chamber for receiving and heating fluid from an external source; said housing further defining an outlet port in fluid communication with the one of said interior chambers for dispensing an amount of heated fluid to a nozzle for spraying heated fluid onto a surface wherein the separating wall comprises a removable cover which at least partially bounds the first chamber and separates said interior chambers, preventing fluid from leaking out of the first chamber into a second chamber of said interior chambers containing electronics;
   b) a heating element disposed in the first chamber for heating fluid that passes from the inlet port to the outlet port through the first chamber;
   c) a heat exchanger supported by said housing in a position that is at least partially covered by fluid within the first chamber and coupled to said heating element so that heat emitting surfaces of said heating element engage and transmit heat to said heat exchanger; and
   d) a control circuit supported by a printed circuit board within the second chamber for energizing said heating element with a voltage and thereby heat fluid passing from the inlet port to the outlet port through the first chamber.

2. The apparatus of claim 1 additionally comprising a flexible seal interposed between the separating wall and the first chamber to inhibit leaking of fluid from the first chamber.

3. The apparatus of claim 1 wherein the separating wall forms a boundary for each of the first and the second chambers.

4. The apparatus of claim 1 wherein the control circuit comprises an electrical interface for communicating with a motor vehicle communications bus to communicate data to other vehicle components coupled to the communications bus.

5. A method of providing a heated cleaning fluid to a vehicle surface comprising:
   a) providing a housing extending in a first direction defining two interior chambers spaced from each other in a second direction perpendicular to the first direction in a side-by-side configuration;
   b) providing an inlet fluid path in fluid communication with one of the interior chambers defining a first chamber for receiving and heating fluid from an external source;
   c) providing an outlet fluid path in fluid communication with the one of the interior chambers for dispensing an amount of heated fluid to a nozzle for spraying heated fluid onto a surface;
   d) separating the first chamber from a second chamber of the interior chambers with a common bounding wall that comprises a removable cover which at least partially bounds the first chamber and extends in the first direction and separates the first chamber and the second chamber in the side-by-side configuration and prevents fluid from leaking from the first chamber into the second chamber;
   e) mounting a heater and a heat exchanger in the first chamber in heat transfer relation to each other for heating fluid that passes through the first chamber;
   f) mounting a control circuit supported by a printed circuit board within the second chamber for energizing the heater with a voltage and thereby heat fluid passing through the first chamber; and
   g) causing fluid to flow through the first chamber while energizing the heater to heat the fluid within the first chamber.

6. The method of claim 5 wherein the heater and heat exchanger are mounted within the first chamber.

7. The method of claim 6 wherein the removable cover is removed during placement of the heat exchanger within the first chamber.

8. The method of claim 5 additionally comprising sealing a region of the wall in the first chamber to inhibit seepage of fluid from the first chamber.

9. The method of claim 5 additionally comprising coupling the control circuit to a motor vehicle communications bus for communicating data to other vehicle components coupled to the motor vehicle communications bus.

10. A fluid heating assembly for providing a heated cleaning fluid to a vehicle surface comprising:
  a) a housing extending in a first direction defining two interior chambers spaced from each other in a second direction perpendicular to the first direction in a side-by-side configuration by a separating wall extending in the first direction, said housing including an inlet port in fluid communication with a first chamber of said interior chambers for receiving and heating fluid from an external source; said housing further defining an outlet port in fluid communication with the first chamber for dispensing an amount of heated fluid to a nozzle for spraying heated fluid onto a surface wherein the separating wall comprises a removable cover which at least partially bounds the first chamber and separates the chambers in the side-by-side configuration, preventing fluid from leaking out of the first chamber into a second chamber of said interior chambers containing electronics;
  b) a power source for heating fluid that passes from the inlet port to the outlet port through said first chamber;
  c) a heat exchanger supported by said housing in a position that is at least partially covered by fluid within the first chamber and including a heating element coupled to the power source so that heat emitting surfaces of said heat exchanger transmit heat to the fluid within the first chamber; and
  d) a control circuit supported by a printed circuit board within the second chamber for energizing said heating element of said heat exchanger with a voltage from the power source and thereby heat fluid passing from the inlet port to the outlet port through the first chamber.

11. The fluid heating assembly of claim 1 wherein said control circuit comprises a thermal fuse to render the heating element inoperable if a temperature threshold is exceeded.

12. The fluid heating assembly of claim 11 wherein the thermal fuse electrically connected to a relay coil to render the relay coil inoperable if the temperature threshold is exceeded.

13. The fluid heating assembly of claim 1 wherein said control circuit comprises a thermal sensor in direct thermal communication with the heating element.

14. The method of claim 5 wherein the control circuit comprises a thermal fuse to render the heater inoperable if a temperature threshold is exceeded.

15. The method of claim 14 wherein the thermal fuse is electrically connected to a relay coil to render the relay coil inoperable if the temperature threshold is exceeded.

16. The method of claim 14 wherein the control circuit comprises a thermal sensor in direct thermal communication with a heating element of the heater.

17. A fluid heating assembly for providing a heated cleaning fluid to a vehicle surface comprising:
  a) a housing extending in a first direction defining two interior chambers spaced from each other in a second direction perpendicular to the first direction in a side-by-side configuration by a separating wall extending in the first direction, said housing including an inlet port in fluid communication with one of said interior chambers defining a first chamber for receiving and heating fluid from an external source; said housing further defining an outlet port in fluid communication with the one of said interior chambers for dispensing an amount of heated fluid to a nozzle for spraying heated fluid onto a surface wherein the separating wall comprises a removable cover which at least partially bounds the first chamber and separates said interior chambers, preventing fluid from leaking out of the first chamber into a second chamber of said interior chambers; and
  b) a heat exchanger supported by said housing in a position that is at least partially covered by fluid within the first chamber so that heat emitting surfaces of said heat exchanger transmit heat.

18. A method of providing a heated cleaning fluid to a vehicle surface comprising:
  a) providing a housing extending in a first direction defining two interior chambers spaced from each other in a second direction perpendicular to the first direction in a side-by-side configuration;
  b) providing an inlet fluid path in fluid communication with one of the interior chambers defining a first chamber for receiving and heating fluid from an external source;
  c) providing an outlet fluid path in fluid communication with the one of the interior chambers for dispensing an amount of heated fluid to a nozzle for spraying heated fluid onto a surface;
  d) separating the first chamber from a second chamber of the interior chambers with a common bounding wall that comprises a removable cover which at least partially bounds the first chamber and extends in the first direction and separates the first chamber and the second chamber in the side-by-side configuration and prevents fluid from leaking from the first chamber into the second chamber;
  e) mounting a heat exchanger in the first chamber for heating fluid that passes through the first chamber.

19. A fluid heating assembly for providing a heated cleaning fluid to a vehicle surface comprising:
  a) a housing extending in a first direction defining two interior chambers spaced from each other in a second direction perpendicular to the first direction in a side-by-side configuration by a separating wall extending in the first direction, said housing including an inlet port in fluid communication with a first chamber of said interior chambers for receiving and heating fluid from an external source; said housing further defining an outlet port in fluid communication with the first chamber for dispensing an amount of heated fluid to a nozzle for spraying heated fluid onto a surface wherein the separating wall comprises a removable cover which at least partially bounds the first chamber and separates the chambers in the side-by-side configuration, preventing fluid from leaking out of the first chamber into a second-chamber of said interior chambers; and
  b) a heat exchanger supported by said housing in a position that is at least partially covered by fluid within the first chamber so that heat emitting surfaces of said heat exchanger transmit heat to the fluid within the first chamber.

\* \* \* \* \*